US009477950B2

(12) United States Patent
Johnson et al.

(10) Patent No.: US 9,477,950 B2
(45) Date of Patent: Oct. 25, 2016

(54) PROGNOSTICS-BASED ESTIMATOR

(71) Applicant: Snap-on Incorporated, Kenosha, WI (US)

(72) Inventors: Lester B. Johnson, Escondido, CA (US); David R. Costantino, San Diego, CA (US); Bradley R. Lewis, Gilroy, CA (US); Roy S. Brozovich, Campbell, CA (US)

(73) Assignee: SNAP-ON INCORPORATED, Kenosha, WI (US)

( * ) Notice: Subject to any disclaimer, the term of this patent is extended or adjusted under 35 U.S.C. 154(b) by 0 days.

(21) Appl. No.: 14/477,407

(22) Filed: Sep. 4, 2014

(65) Prior Publication Data
US 2016/0071334 A1  Mar. 10, 2016

(51) Int. Cl.
*G06Q 30/02* (2012.01)
*G06Q 10/00* (2012.01)
*G07C 5/08* (2006.01)

(52) U.S. Cl.
CPC ............ *G06Q 10/20* (2013.01); *G07C 5/0808* (2013.01)

(58) Field of Classification Search
CPC ................................. G07C 5/08; G06Q 10/20
USPC ....................................................... 701/29.1
See application file for complete search history.

(56) References Cited

U.S. PATENT DOCUMENTS

| 7,636,676 | B1 | 12/2009 | Wolery | |
| 8,131,417 | B2 * | 3/2012 | Picard | G06Q 10/06 701/29.1 |
| 8,650,068 | B2 * | 2/2014 | Esser | G06Q 30/02 701/31.8 |
| 8,849,497 | B2 * | 9/2014 | Zhang | G06Q 10/20 701/29.1 |
| 2002/0007237 | A1 | 1/2002 | Phung et al. | |
| 2002/0103583 | A1 | 8/2002 | Ohmura | |
| 2002/0138185 | A1 | 9/2002 | Trsar et al. | |
| 2003/0004624 | A1 | 1/2003 | Wilson et al. | |
| 2003/0195681 | A1 | 10/2003 | Rother | |

(Continued)

FOREIGN PATENT DOCUMENTS

| WO | 2007/035195 A2 | 3/2007 |
| WO | 2014001799 A1 | 1/2014 |

OTHER PUBLICATIONS

International Search Report for related international application No. PCT/US14/54105 mailed Jun. 3, 2015.

(Continued)

*Primary Examiner* — Behrang Badii
*Assistant Examiner* — Michael Berns
(74) *Attorney, Agent, or Firm* — McDonnell Boehnen Hulbert & Berghoff LLP

(57) ABSTRACT

Described herein are methods and devices for determining potential-repair information related to a vehicle based on content of a vehicle repair database. According to an example method, a computing device can receive vehicle information that includes a vehicle identifier for a vehicle type. The computing device can then determine, based on the vehicle information, at least two top repair order items in a first category of repair order items. For example, the at least two top repair order items may be related to the first vehicle type and determined from among a plurality of repair order items in the first category of repair order items that are related to the first vehicle type. The example method can further involve providing, by the computing device, a display of a graphical representation of the at least two top repair order items in the first category of repair order items.

20 Claims, 25 Drawing Sheets

(56) References Cited

U.S. PATENT DOCUMENTS

| | | |
|---|---|---|
| 2004/0176885 A1 | 9/2004 | Quinn |
| 2005/0085964 A1 | 4/2005 | Knapp et al. |
| 2006/0106797 A1 | 5/2006 | Srinivasa et al. |
| 2008/0004764 A1 | 1/2008 | Chinnadurai et al. |
| 2009/0062977 A1 | 3/2009 | Brighenti |
| 2009/0062978 A1* | 3/2009 | Picard .................. G06Q 10/06 701/31.4 |
| 2009/0295559 A1 | 12/2009 | Howell et al. |
| 2010/0063668 A1 | 3/2010 | Zhang et al. |
| 2011/0118905 A1 | 5/2011 | Mylaraswamy et al. |
| 2011/0172874 A1 | 7/2011 | Patnaik et al. |
| 2011/0238258 A1 | 9/2011 | Singh et al. |
| 2012/0130844 A1* | 5/2012 | Picard .................. G06Q 10/06 705/26.4 |
| 2012/0245791 A1 | 9/2012 | Yun et al. |
| 2012/0303205 A1 | 11/2012 | Subramania et al. |
| 2012/0323616 A1 | 12/2012 | Schricker et al. |
| 2014/0279169 A1* | 9/2014 | Leos .................. G06Q 30/0611 705/26.4 |
| 2015/0066781 A1 | 3/2015 | Johnson et al. |

OTHER PUBLICATIONS

Written Opinion for related international application No. PCT/US14/54105 mailed Jun. 3, 2015.

Muller, Tobias Carsten; et al.; A Heuristic Approach for Offboard-Diagnostics in Advanced Automotive Systems; Apr. 20, 2009; 9 pages; SAE World Congress 2009, Detroit, MI, USA; SAE Document No. 2009-01-1027.

Jain, Anil K.; Mao, Jianchang; Mohiuddin, K.M; Artificial Neural Networks: A Tutorial; Mar. 1996; 14 pages; IEEE.

Jain, A.K.; Murty, M.N.; Flynn, P.J.; Data Clustering: A Review; Sep. 1999; 60 pages; ACM Computing Surveys, vol. 31, No. 3.

Non-final Office Action for U.S. Appl. No. 14/019,503 mailed Jan. 4, 2016.

\* cited by examiner

PROBLEM: Timing belt replacement

Prognostics #1

Cost:     $300
Time:     2 hours

DESCRIPTION OF PROBLEM:
The timing belt, which synchronizes rotation of the crankshaft and camshaft, is recommended by the manufacture to be replaced every 70,000 miles. The timing belt may need to be replaced due to stripped teeth or delamination.

CONSEQUENCE OF PROBLEM:
Failure to replace a damaged timing belt can lead to complete breakdown or catastrophic engine failure.

Prognostics Information

2008 Chevrolet Impala

| TOP PATTERN FAILURES | 10K | 30K | 50K | 68k ↓ 70K | 90K | 110K | 130K | 150K |
|---|---|---|---|---|---|---|---|---|
| ✓ 1. Tie Rod End | | | ■ | | | | | |
| ☐ 2. Hub Assembly | | | | ■ | | | | |
| ☐ 3. Door Lock Actuator | | | ■ | | | | | |
| ☐ 4. Gas Cap | | | ■ | | | | | |
| ☐ 5. Engine Coolant Thermostat | | | | ■ | | | | |
| ☐ 6. Wheel Bearing & Hub Assembly | | | | | | | | |
| ☐ 7. Oil Pressure Switch/Sender | | | | ■ | | | | |
| ☐ 8. Water Pump | | | | ■ | | | | |
| ☐ 9. Power Steering Pump | | ■ | | | | | | |
| ✓ 10. Ball Joint | | | | | | | | |
| ☐ 11. ... | | | | | | | | |

FIGURE 4C

ESTIMATE

CUSTOMER INFORMATION

| | | | | |
|---|---|---|---|---|
| Name | First | Last | Phone | Home Phone |
| | | | | Mobile Phone |
| Address | Address Line 1 | Company | Email | Email Address |
| | Address Line 2 | | | |
| | City | State | Zip | |
| Vehicle | Year | Make | Model | |
| | | | Mileage | VIN |

QUOTE

| DESCRIPTION | PART # | QTY | PRICE | RATE | HOURS | LINE TOTAL |
|---|---|---|---|---|---|---|

| | |
|---|---|
| Labor | 0.00 |
| Parts | 0.00 |
| Shop Supplies | 0.00 |
| Hazardous Mat. | 0.00 |
| Labor Taxes | 0.00 |
| Parts Taxes | 0.00 |
| Total | 0.00 |

PATTERN FAILURE TRAVELER

TOP COMPONENTS

☐ Water Pump
☐ Ignition Coil
☑ Brake Caliper
☐ Oxygen Sensor
☐ Anti-Lock Brake Wheel Speed Sensor

TOP FIXES — 1300A

Brake Caliper Fixes

☐ 1. Brake Caliper R&R
☐ 2. ....
☐ 3. ....

[ TRANSFER ] — 1302

TOP CODES

☐ 1. P0100 – Mass Air Flow Sensor
☐ 2. P0103 – Coolant Temperature Sensor
☐ 3. P0138 – Oxygen Sensor
☐ 4. P0300 – Cylinder Misfire
☐ 5. P0440 – EVAP System Malfunction

TOP SYMPTOMS

☐ 1. Hear – Rattle
☐ 2. Hear – Grinding
☐ 3. Hear – Squeal
☐ 4. See – Smoke
☐ 5. Smell – Odor (1100)

Tabs: Estimate | Traveler

FIGURE 13A

PATTERN FAILURE TRAVELER

TOP COMPONENTS

☐ Water Pump
☐ Ignition Coil
☐ Brake Caliper
☐ Oxygen Sensor
☐ Anti-Lock Brake Wheel Speed Sensor

TOP CODES

☐ 1. P0100 – Mass Air Flow Sensor
☐ 2. P0103 – Coolant Temperature Sensor
☐ 3. P0138 – Oxygen Sensor
☐ 4. P0300 – Cylinder Misfire
☐ 5. P0440 – EVAP System Malfunction

TOP FIXES

Hear – Rattle Fixes

☐ 1. . . . .
☐ 2. . . . .
☐ 3. . . . .

[ TRANSFER ] — 1302

TOP SYMPTOMS

☑ 1. Hear – Rattle
☐ 2. Hear – Grinding
☐ 3. Hear – Squeal
☐ 4. See – Smoke
☐ 5. Smell – Odor 1300C
1100

FIGURE 13C

ESTIMATE

CUSTOMER INFORMATION

| | | | | |
|---|---|---|---|---|
| Name | John | Smith | Phone | 555-1234 |
| Address | 123 Main Street | ABC Co. | | 555-4567 |
| | Address Line 2 | | Email | john@ABCco.com |
| | City | State | Zip | |
| Vehicle | 2008 | Chevrolet | Impala | 85,123 | 1V01234567ABC1234ZQ |

QUOTE

| DESCRIPTION | PART # | QTY | PRICE | RATE | HOURS | LINE TOTAL |
|---|---|---|---|---|---|---|
| Brake Caliper R&R | 1234 | 2 | 85.99 | 75.00 | 1.5 | 257.48 |

| | |
|---|---|
| Labor | 112.50 |
| Parts | 171.98 |
| Shop Supplies | 5.00 |
| Hazardous Mat. | 0.00 |
| Labor Taxes | 0.00 |
| Parts Taxes | 11.18 |
| Total | 300.66 |

FIGURE 14

PROGNOSTICS-BASED ESTIMATOR

BACKGROUND

All vehicles produced by manufacturers occasionally have to be repaired. In some cases, a vehicle owner may notice a change in the performance of their vehicle, prompting the vehicle owner to bring the vehicle to a repair shop to diagnose a problem and potentially repair the vehicle. In other cases, an electronic control module of the vehicle may detect a fault and provide a malfunction indication via an instrument panel of the vehicle. If the vehicle owner notices the indication, the vehicle owner may bring their vehicle to a repair shop for service. In either scenario, the vehicle owner may be unaware of what type of service needs to be performed on the vehicle as well as the costs and labor time associated with the repair.

When an operator brings their vehicle to a repair shop for service, it is generally expected and many times a legal requirement that a repair shop provide an estimate of charges to a customer prior to proceeding with the repair of the vehicle. In many cases, (as the examples above cite), diagnostic efforts must be performed to determine the root cause and therefore arrive at an estimate of the repairs needed to address the symptom exhibited by the vehicle. Today the repair shop may offer to diagnose the vehicle and contact the vehicle owner later once the root cause has been identified. After the root cause has been identified, a service writer may prepare a revised estimate of the repair costs and time. In many cases, by the time a specific repair estimate has been prepared, the vehicle owner is off-site. For instance, the vehicle owner may be at work or at home and may not be easily accessible. Additionally, in some instances, the repair shop may also charge the vehicle owner a diagnostic charge to cover the time needed by the repair shop to identify the root cause of a vehicle malfunction and prepare the estimate. Improvements are therefore desired.

SUMMARY

When a vehicle is brought into a repair shop without a known repair to be performed, currently, there is not an efficient method for the service writer to give guidance on possible repairs and associated charges. Described herein are methods and devices for determining estimate information related to at least one potential vehicle fix for a vehicle based on vehicle information and content of a vehicle repair database. In some instances, the vehicle repair database can include data gathered from multiple repair shops regarding repairs performed on various vehicles by the multiple repair shops. As described herein, the data of the vehicle repair database can be used to determine frequencies with which problems with a vehicle arise, as well as associated charges that could result, based on historical failure data for particular vehicles or vehicle types.

Furthermore, described herein are methods and devices for interacting with a vehicle-diagnostic record to facilitate diagnosing the root cause of a vehicle malfunction. In some instances, a first client device that receives vehicle information may interact with a vehicle-diagnostic record by associating the vehicle information with the vehicle-diagnostic record. A second client device may also interact with the vehicle-diagnostic record by accessing the vehicle-diagnostic record and referring to the associated vehicle information when diagnosing the root cause of a vehicle malfunction. The second client device may determine, using the vehicle information, a few of the top repair order items related to a vehicle type in at least one category of repair order items, and provide a graphical representation of the top repair order items. For instance, the top repair order items may include at least two of the top repaired components for a particular vehicle type. In some instances, a service technician may use the graphical representation to quickly verify whether any of the top repaired components are malfunctioning for the particular vehicle that the service technician is diagnosing. The first or second client device may also perform various other functions when interacting with the vehicle-diagnostic record as described herein.

In one example aspect, a method is provided that involves determining, by a computing device, vehicle information that comprises a first vehicle identifier for a first vehicle. The method also involves determining, by the computing device and based on the vehicle information, at least two top repair order items in a first category of repair order items. The at least two top repair order items in the first category of repair order items are related to the first vehicle type and determined from among a plurality of repair order items in the first category of repair order items that are related to the first vehicle type. Additionally, the method involves providing, by the computing device and for display, a graphical representation of the at least two top repair order items in the first category of repair order items.

In another example aspect, a computing device that includes at least one processor and a computer-readable medium is provided. The computer-readable medium is configured to store instructions, that when executed by the at least one processor, cause the computing devices to perform functions. The functions include determining vehicle information that comprises a first vehicle identifier for a first vehicle type. The functions also include determining, based on the vehicle information, at least two top repair order items in a first category of repair order items. The at least two top repair order items in the first category of repair order items are related to the first vehicle type and determined from among a plurality of repair order items in the first category of repair order items that are related to the first vehicle type. And the functions further include providing for display a graphical representation of the at least two top repair order items in the first category of repair order items.

In still another example aspect, a system that includes a first client device and a second client device is provided. The first client device is configured to receive, via a first interface provided on the first client device, vehicle information that comprises a first vehicle identifier for a first vehicle type; and associate the vehicle information with a first vehicle-diagnostic record corresponding to a first vehicle. The second client device is configured to determine, based on the vehicle information associated with the vehicle-diagnostic record, at least two top repair order items in a first category of repair order items. The at least two top repair order items in the first category of repair order items are related to the first vehicle type and determined from among a plurality of repair order items in the first category of repair order items that are related to the first vehicle type; and provide for display a graphical representation of the at least two top repair order items in the first category of repair order items.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 3A, 3B, 4A, 4B, and 4C are conceptual illustrations of features of an example interface of a computing device.

FIGS. 10, 11, 12A, 12B, 12C, 13A, 13B, 13C, 14, and 15 are conceptual illustrations of features of example interfaces of a computing device.

DETAILED DESCRIPTION

Figure 1:
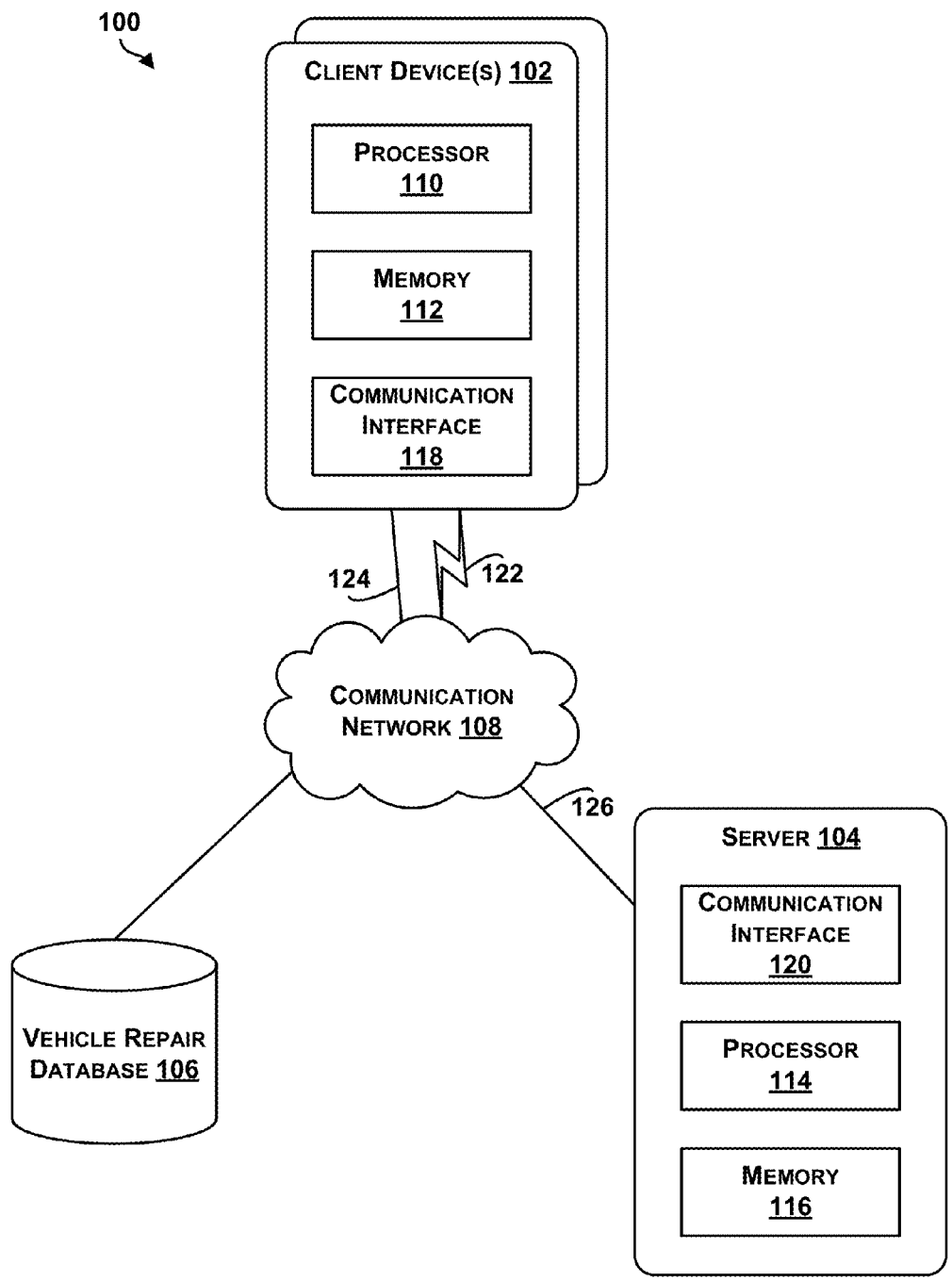
FIG. 1 illustrates an example system.

The following detailed description describes various features and functions of the disclosed systems and methods with reference to the accompanying figures. In the figures, similar reference numbers identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

The example embodiments are applicable to a variety of repairable items, such as a vehicle or some other type of repairable item. For purposes of this description, a vehicle can comprise an automobile, a motorcycle, a semi-tractor, a light-duty truck, a medium-duty truck, a heavy-duty truck, a farm machine, a boat or ship, a generator, an airplane, an oil-drilling rig, or some other type of vehicle. A vehicle can include or use any appropriate voltage or current source, such as a battery, an alternator, a fuel cell, a capacitor, and the like, providing any appropriate current and/or voltage, such as about 12 volts, about 42 volts, and the like. A vehicle can include or use any desired system or engine. Those systems or engines can comprise items that use fossil fuels, such as gasoline, natural gas, propane, and the like, electricity, such as that generated by a battery, magneto, fuel cell, solar cell and the like, wind and hybrids or combinations thereof.

This disclosure discloses, among other things, methods and devices for determining estimate information related to at least one potential vehicle fix for a vehicle based on vehicle information and content of a vehicle repair database. In some instances, the vehicle repair database can include data gathered from multiple repair shops regarding repairs performed on various vehicles by the multiple repair shops. For example, the data of the vehicle repair database can be used to determine estimates of possible problems with a vehicle and associated charges that could result based on historical failure data for particular vehicles or vehicle types.

According to an example method, a computing device can receive vehicle information that includes a vehicle identifier and vehicle-usage data for a vehicle. In one embodiment, the computing device can include a computing device in a server that is configured to communicate with a client computing device via a communication network. The vehicle information can include a year, make, and model (YMM) of the vehicle or a vehicle identification number (VIN). A VIN may include a build date, build site, engine type, or other information about a vehicle. The vehicle information can also include other types of information that differentiates different models or types of vehicles, such as regular production option (RPO) codes that refer to a specific option or modification to a vehicle. For example, the vehicle information may indicate that a vehicle includes a trailer hauling package or various other components that a vehicle can be manufactured or equipped with.

The vehicle-usage data may be data that is indicative of how much the vehicle has been used. Vehicle use is typically measured in either miles or kilometers driven or hours of operation. For instance, if the vehicle is an automobile or truck, the vehicle-usage data may be an odometer reading that indicates a number of miles driven by the vehicle. In another instance, the vehicle may be a boat, aircraft, generator, oil-drilling rig and the vehicle-usage data may be an hour meter reading that indicates a number of hours of operation. Thus, the vehicle-usage data may provide an indication of vehicle usage. Other examples of vehicle-usage data may also exist. Although portions of this disclosure are described with respect to an odometer reading or mileage of a vehicle, the examples are not meant to be limiting.

Additionally, in some examples, the vehicle information can include symptom information describing a condition of the vehicle. As an example, the symptom information can be "engine hesitates on takeoff" or "engine is overheating". In other examples, the vehicle information can include one or more diagnostic trouble codes (DTCs). A DTC may be a generic or manufacturer-specific code that is used to identify vehicle problems, such as "Throttle/Petal Position Sensor/Switch Malfunction" or "Transmission Control System Malfunction". In still other examples, the vehicle information can include an indication that a malfunction indicator lamp of the vehicle is illuminated. Other examples may also exist.

Based on the vehicle information, the computing device can determine repair information of a vehicle repair database relating to the vehicle. The repair information can include at least one potential vehicle fix to a given malfunction. In one example, the repair information can include one or more of the most frequently performed vehicle fixes for the vehicle within a range of the mileage of the vehicle. For instance, if the vehicle is a vehicle sold under the trademark TOYOTA TUNDRA that has 47,000 miles, the repair information can include the ten most frequently performed vehicle fixes for vehicles sold under the trademark TOYOTA TUNDRA having between 40,000 and 55,000 miles. Other examples are possible, and the example is not meant to be limiting.

In an instance in which the vehicle information includes symptom information or a DTC, the repair information can also include a successful fix percentage associated with the symptom information or DTC. For instance, the successful fix percentage can indicate a percentage of similar vehicles with the same or similar symptom information that were successfully fixed by performing the at least one potential vehicle fix to the similar vehicles.

The computing device can also determine estimate information related to the at least one potential vehicle fix. Such estimate information can include a repair time and/or repair cost, for example. A repair cost may be a cost to perform a vehicle fix. That is, the repair cost may be a cost that is charged to a customer to perform the vehicle fix. As such, the repair cost can include a labor cost, and can also include a cost of one or more parts, as well as any other costs associated with performing the repair. The estimate information can also be provided to a communication network such that the estimate information can be provided to another computing device (e.g., a client computing device of a repair shop).

In some examples, the estimate information can enable a service writer to prepare an estimate for the at least one vehicle service. If the repair information identifies multiple vehicle fixes, the service writer can use estimate information related to each of the vehicle fixes to request preapproval from a vehicle owner for one or more of multiple possible repairs. For instance, when a vehicle owner brings the vehicle to the repair shop, the service writer can request approval from a vehicle owner to perform one or more repairs if a technician determines that the vehicle requires one of the repairs.

Similarly, the example method can allow a service writer to provide an estimate to a vehicle owner and seek preapproval for one or more repairs before the vehicle is brought to the repair shop (e.g., over the phone, via a webpage, via a web-based application, etc.). In one example, if a vehicle owner is given direct access to the web-based application, the estimate information provided to vehicle owner via the web-based application may identify an estimated repair cost and/or repair time without identifying the particular vehicle service that may need to be performed.

According to another example method, a computing device can determine vehicle information that includes a first vehicle identifier for a first vehicle type. The first vehicle identifier can include a particular vehicle identifier that identifies a particular instance of a vehicle or the first vehicle identifier can include a generic vehicle identifier that identifies a vehicle type that includes the particular instance of the vehicle and one or more other additional instances of the vehicle. A particular vehicle identifier can, for example, include a VIN including a unique serial number of the particular instance of the vehicle. A generic vehicle identifier can, for example, include a YMM or a portion of a VIN without a unique serial number.

The computing device can be a client device that is configured to communicate with a server via a communication network. For instance, the client device can access or receive a vehicle-diagnostic record that includes the vehicle information.

The vehicle-diagnostic record can be configured in various ways. In one example, the vehicle-diagnostic record may be a data file or data structure, or group of data files or data structures, that can "travel" (e.g., be accessed by) multiple computing devices (e.g., a first client device used by a service writer and a second client device used by a technician). Accordingly, the vehicle-diagnostic record may be referred to as a traveler in portions of this disclosure.

In one embodiment, the vehicle-diagnostic record may be a data file or data structure that is uploaded to a central server for storage in a cloud computing environment. The vehicle-diagnostic record may be accessible by one or more client devices, and each of the one or more client devices can access, supplement, and/or amend information of the vehicle-diagnostic record using cloud collaboration technologies. For instance, a server may centrally host software for interacting with vehicle-diagnostic records, and a client device may access the vehicle-diagnostic records by executing a thin client via a web browser. Alternatively, the client device may access the vehicle-diagnostic record using an application programming interface.

In another embodiment, the vehicle-diagnostic record may be a data file that the computing device receives from another computing device (e.g., a server or a client device). By way of example, the computing device can receive a copy of a vehicle-diagnostic record via a communication network. The computing device can then amend or supplement the vehicle-diagnostic record, and send the vehicle diagnostic record back to the computing device from which it received the vehicle-diagnostic record (or to another computing device).

Using the vehicle information, the computing device can determine potential-repair information related to the first vehicle type. For instance, the computing device can determine at least two of the top repair order items in one, or perhaps multiple, categories of repair order items. Generally, a repair order item can include any item listed in a repair order of a vehicle repair database. By way of example, a repair order can include a variety of types of repair order items, such as repaired components, reported diagnostic trouble codes, reported symptoms (e.g., customer complaints), causes of symptoms, and corrections of symptoms, among other possible items. Further, repair order items may be associated with particular categories, such as a repaired components category, reported diagnostic trouble codes category, and reported symptoms category. Thus, in some examples, using the vehicle information, the computing device can determine one or any combination of: at least two of the top repaired components related to the vehicle type, at least two of the top reported DTCs related to vehicle type, and at least two of the top reported symptoms related to the vehicle type. In other examples, the computing device can provide less than two top repair order items related to the first vehicle type. For instance, the computing device can determine zero or only a single top repaired component, zero or only a single reported diagnostic trouble codes, and/or zero or only a single top reported symptom related to the vehicle type. In line with the discussion above, the computing device can determine the potential-repair information by querying a vehicle repair database that includes data gathered from multiple repair shops regarding repairs performed on various vehicles by the multiple repair shops.

Further, the computing device can provide a display of a graphical representation of the determined potential-repair information related to the first vehicle type. For instance, the computing device can provide a display of one or any combination of the at least two top repaired components related to the first vehicle type, the at least two top reported DTCs related to first vehicle type, and the at least two top reported symptoms related to the first vehicle type. In one instance, the computing device can provide the determined potential-repair information for display on an interface of the computing device. A technician or other user can then interact with the computing device to determine additional information associated with the potential-repair information.

As one example, a technician can select a particular repair order item of the at least two top repair order items in a category. In response to receiving the selection, the computing device can provide a display of one or more potential vehicle fixes associated with the particular repair order item. Additionally or alternatively, the computing device can provide a display of a vehicle-usage profile for the particular repair order item. For instance, the vehicle-usage profile may be indicative of a distribution of a plurality of repair orders over a plurality of vehicle-usage intervals.

As further described below, a user can interact with a graphical representation provided by the computing device in various other ways as well. For instance, a user can use the interface to access potential vehicle fixes or vehicle-usage profiles associated with particular DTCs or particular symptoms. Furthermore, the user can select one or more potential vehicle fixes using the interface on the computing device. In one instance, the one or more potential vehicle fixes may be a vehicle fix for inclusion within a repair estimate. For example, when diagnosing a particular vehicle at a repair shop, a technician can use the interface of the computing device to view potential vehicle fixes and select one or more appropriate vehicle fixes to be performed in order to repair the vehicle. In response to receiving a selection of a potential vehicle fix, the computing device can associate the potential vehicle fix with a vehicle-diagnostic record corresponding to the particular vehicle. As a result, when a service writer or other user subsequently accesses the vehicle-diagnostic record, the service writer can view the potential vehicle fix selected by the technician.

Further in line with the discussion above, in some examples, a server that maintains the vehicle-diagnostic record, or another computing device, can determine estimate information related to potential vehicle fixes that are associated with the vehicle-diagnostic record. For example, the estimate information may include a repair time and/or repair cost. And the server can also associate the estimate information with the vehicle-diagnostic record, such that a service writer or other user can view the estimate information when accessing the vehicle-diagnostic record.

As mentioned above, this description describes several example embodiments. Within this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. The ordinal numbers can be written in the form of 1st, 2nd, 3rd, and so on. This application hereby incorporates by reference the entire contents of U.S. patent application Ser. No. 14/019,503 filed Sep. 5, 2013.

Additional functionalities and examples of the described methods and computing devices are also described hereinafter with reference to the accompanying figures.

Referring now to the Figures, FIG. 1 illustrates an example system 100. As shown in FIG. 1, the example system 100 includes one or more client devices 102, a server 104, a vehicle repair database 106, and a communication network 108. The client devices 102 can represent any type of mobile or stationary computing devices. By way of example, the client devices 102 can be one or more computers located at a repair shop. However, the example is not meant to be limiting. In other instances, the client devices 102 can be laptop computers, tablets, cellular phones, wearable computing devices, or other types of computing devices.

The server 104 can similarly be any type of computing device. In one instance, the server 104 can be located remotely from the client devices 102 (e.g., in a cloud computing environment). For example, the server 104 can be a desktop computer, workstation, or other type of computing device configured to operate within a client-server architecture. In another instance, the server 104 can be a computing device that is located at a repair shop. For example, the server 104 may be a computing device used by a repair shop to manage repair orders or shop equipment that is used to diagnose and service vehicles. Other configurations are also contemplated.

Each of the client devices 102 can include a processor 110 and a memory 112. Similarly, the server 104 can also include a processor 114 and a memory 116. The processor 110 and the processor 114 can be any type of processors, such as a microprocessor, digital signal processor, multicore processor, etc., coupled to the memory 112 and memory 116 respectively. The memory 112 and the memory 116 can be any type of memories, such as volatile memory like random access memory (RAM), dynamic random access memory (DRAM), static random access memory (SRAM), or non-volatile memory like read-only memory (ROM), flash memory, magnetic or optical disks, digital versatile disk read-only memory (DVD-ROM), or compact-disc read-only memory (CD-ROM), among other devices used to store data or programs on a temporary or permanent basis.

Additionally, each of the client devices 102 can include a communication interface 118 and the server 104 can include a communication interface 120. The communication interface 118 and the communication interface 120 can facilitate communication with the communication network 108 for the client devices 102 and the server 104 according to one or more wired or wireless communication standards. For instance, the communication interface 118 and the communication interface 120 can facilitate data communication via network links 122, 124, and 126. The communication interface 118 and the communication interface 120 can include a transmitter to transmit data and a receiver to receive data. Alternatively, the communication interface 118 and the communication interface 120 can include a transceiver configured to transmit and receive data.

The vehicle repair database 106 can be or include a data storage device, such as a non-transitory computer-readable storage device. Although the vehicle repair database is shown connected to the server 104 via the communication network 108, in another embodiment, the vehicle repair database 106 can be directly connected to or a component of the server 104 (not shown). The vehicle repair database 106 can store a plurality of repair orders. Each repair order can include information pertaining to repairing a vehicle. Additionally or alternatively, each repair order can include other information such as information pertaining to performing preventative maintenance to a vehicle. The repair order can be created in an electronic format or can be prepared in paper format and manually entered into a computer or converted (e.g., scanned) to an electronic format. Text of a scanned repair order can also be recognized using optical character recognition (OCR) techniques. In some examples, a repair order can be arranged as a structured query language (SQL) file. Alternatively or additionally, a repair order can be arranged as an extensible markup language (XML) file.

By way of example, a repair order can include a combination of any of a service provider identifier, a date of service identifier, a customer identifier that indicates a customer seeking service of a given vehicle, vehicle information that indicates the given vehicle, a service request indicating the complaint or service requested by the customer, parts information indicating parts obtained for servicing the given vehicle, and service procedure information carried out on the given vehicle.

A service provider identifier can include, for example, information that indicates a name and geographic location of the service provider. Vehicle information can include a VIN associated with the given vehicle, a year, make, and model (YMM) of the vehicle, a year, make model, and engine (YMME) of the vehicle, or a year, make, model, engine, and system (YMMES) of the vehicle. Note that a system of a vehicle may sometimes alternatively be referred to as a category. A few examples of a system/category of a vehicle include brakes, steering, and suspension, for instance. Service procedure information can include labor operation codes (LOCs) that refer to a particular operation performed to the given vehicle. The LOCs can conform to those defined by a vehicle manufacturer, a service provider that generates a repair order, a service information provider, such as Mitchell Repair Information, LLC, Poway, Calif., or some other entity. The service procedure information can also identify a total cost for the service. Similarly, the parts information can include a part description, part number, and/or pricing information identifying any parts associated with the repair order.

In one embodiment, repair orders can be stored in local computing systems of repair shops and can be backed up and transmitted to the vehicle repair database 106 on a frequent basis (e.g., hourly, daily, weekly, etc.). When a request for estimate information is received, the server 104 can search the repair orders of the vehicle repair database 106. In some instances, the vehicle repair database 106 can also store search queries and associated search results from prior searches to facilitate quickly retrieving information from the vehicle repair database 106. For instance, the server 104 can be configured to access a list of prior searches before searching the entire vehicle repair database 106 to identify whether search results are already stored by the vehicle repair database 106 for a given search. The stored search results may also be updated on a periodic basis by the vehicle repair database 106. For example, when the vehicle repair database 106 is updated with new repair orders, the server 104 or a separate computing device may re-search the vehicle repair database 106 to update the stored search results.

Figure 2:
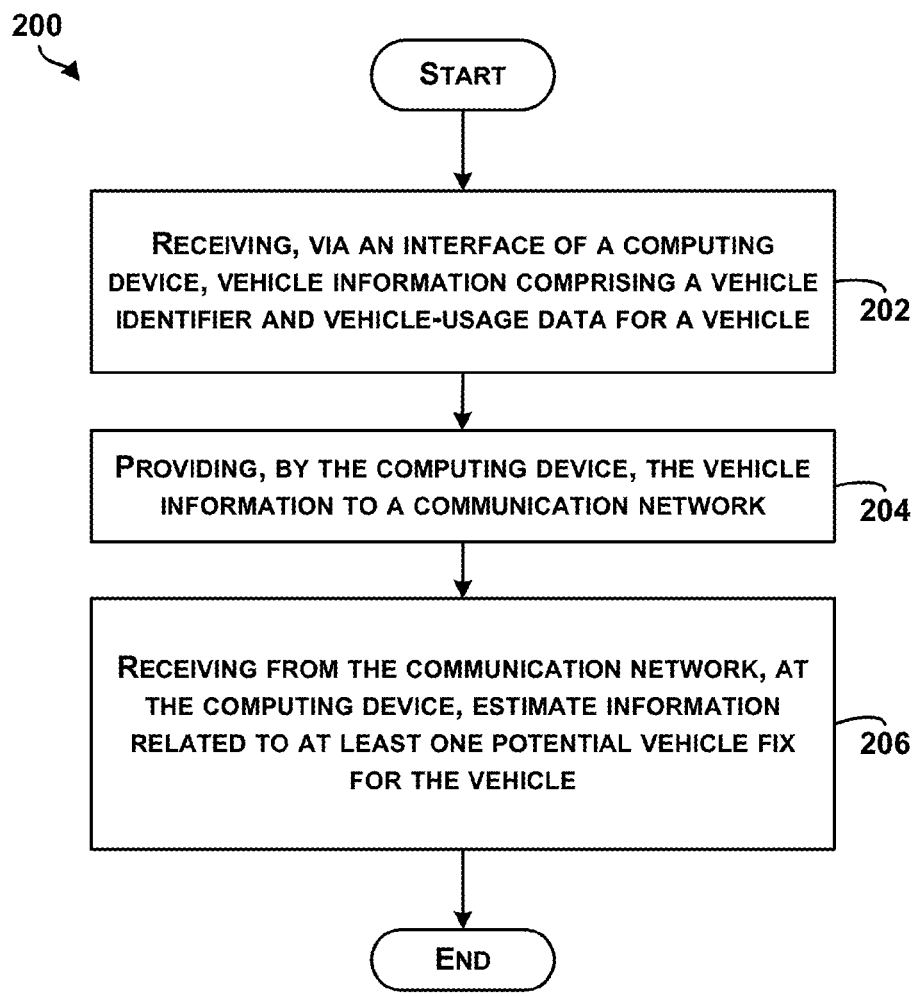
FIG. 2 is a block diagram of an example method for determining estimate information.

As discussed briefly above, data of the vehicle repair database can be used by a service writer of a repair shop to facilitate estimating the cost and/or time to perform services. Turning now to FIG. 2, FIG. 2 is a block diagram of an example method 200 for determining estimate information. Method 200 shown in FIG. 2 presents an embodiment of a method that could be used or implemented by the client devices 102 of FIG. 1, for example, or by components of the client devices 102 of FIG. 1, or more generally by any of a variety of computing devices. Method 200 can include one or more operations, functions, or actions as illustrated by one or more of blocks 202-206. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block can represent a module, a segment, or a portion of program code, which includes one or more instructions executable by a processor or computing device for implementing specific logical functions or steps in the process. The program code can be stored on any type of computer-readable medium, for example, such as a storage device including a disk or hard drive. The computer-readable medium can include non-transitory computer-readable medium, for example, such as computer-readable media that stores data for short periods of time like register memory, processor cache and random access memory (RAM). The computer-readable medium can also include non-transitory media, such as secondary or persistent long term storage, like read only memory (ROM), optical or magnetic disks, compact-disc read only memory (CD-ROM), for example. The computer-readable medium can also be any other volatile or non-volatile storage systems. The computer-readable medium can be considered a computer-readable storage medium, for example, or a tangible storage device.

In addition, for the method 200 and other processes and methods disclosed herein, each block in FIG. 2 can represent circuitry that is wired to perform the specific logical functions in the process.

Initially, at block 202, the method 200 includes receiving, via an interface of a computing device, vehicle information comprising a vehicle identifier and vehicle-usage data for a vehicle. In one instance, a service writer or vehicle owner can manually input the vehicle identifier and an odometer reading by keying in or otherwise selecting the vehicle identifier and odometer reading via a user interface of the computing device. In another instance, a service writer or vehicle owner can manually input the vehicle identifier and an hour meter reading using the user interface of the computing device. Alternatively, the computing device may request the vehicle information, or a portion of the vehicle information, from an electric control unit of the vehicle by way of a wired or wireless vehicle data bus. In another example, the computing device may receive a vehicle diagnostic report (e.g., an email) from a remote diagnostics system of a vehicle (e.g., OnStar or another source). The computing device can then automatically parse the email to determine the vehicle information. The vehicle identifier can identify a particular vehicle. For instance, the vehicle identifier can be a VIN. In another example, the vehicle identifier can identify a particular vehicle type. For instance, the vehicle identifier can include a YMM, YMME, or YMMES.

The vehicle information may also include symptom information describing a condition of the vehicle. The symptom information can identify a condition of the vehicle as reported by a customer, for example. As an example, the symptom information can indicate a symptom that is exhibited by the vehicle and/or reported by a vehicle owner such as "engine hesitates on takeoff", "rough engine idle", "engine cranks but won't start", "poor gas mileage", or "check engine light is on". A check engine light can also be referred to as a malfunction indicator lamp that, when illuminated on an instrument panel of a vehicle, indicates a malfunction of a computerized engine management system of the vehicle. Alternatively or in addition, the vehicle information may include one or more DTCs and/or an indication that a malfunction indicator lamp of the vehicle is illuminated.

At block 204, the method 200 includes providing, by the computing device, the vehicle information to a communication network. In one example, upon receiving data indicating a request to determine estimate information related to one or more potential repair services, the computing device can provide the vehicle information to another computing device (e.g., a server) by way of the communication network. For instance, a service writer can click or otherwise select an icon, press a button or key, or otherwise trigger a request to retrieve estimate information. The computing device can then generate a request for estimate information based on the vehicle information provided via the interface. The request can then be transmitted by a communication interface of the computing device to the communication network.

At block 206, the method 200 includes receiving from the communication network, at the computing device, estimate information related to at least one potential vehicle fix for the vehicle. In one example, in response to providing the vehicle information to the communication network, the computing device can receive the estimate information. The estimate information related to the at least one potential vehicle fix can include a repair time and/or repair cost. In an embodiment in which a vehicle owner is requesting the estimate information directly (e.g., via a web-based application), the estimate information may identify the repair time and/or repair cost without identifying the potential vehicle fix. As discussed above, the repair cost may include any costs associated with performing the at least one potential vehicle fix, such as labor costs and part costs. In an embodiment, in which the vehicle information includes symptom information, the estimate information related to the at least one potential vehicle fix can include a successful fix percentage associated with the symptom information.

Additionally or alternatively, the estimate information can include a range of repair costs for the at least one potential vehicle fix. For instance, the range of repair costs can indicate repair costs of service repairs that have recently been performed by competitors of a particular repair shop (e.g., repair shops within a predetermined geographical area of a location of the particular repair shop). In such an instance, the particular repair shop can be identified based on an identity of the computing device that provided the vehicle information. For instance, the computing device can be registered with an entity that provides the estimate information such that the location of the particular repair shop is known.

In some examples, the method 200 can further include providing the estimate information for display via the interface of the computing device. For instance, the estimate information can be provided for display to assist a service writer in preparing an estimate for a vehicle owner. In that regard, the client devices 102 of FIG. 1 can include a display and a user interface (not shown).

In another example, the method 200 can further include providing the estimate for display via a display of a vehicle. For instance, if the vehicle information is received by the computing device from a remote diagnostics system of the vehicle, the estimate information may be provided, via the communication network, to the remote diagnostics system for display within the vehicle.

In other examples, the method 200 can also include receiving from the communication network estimate information related to at least one future vehicle service for the vehicle. In some instances, estimate information related to a future vehicle service(s) can assist a service writer in preparing a maintenance plan with a vehicle owner. The estimate information related to the future vehicle service can also include a repair cost and/or repair time. The future vehicle service(s) can be determined based on failure trends of vehicles which are functionally similar to the vehicle.

In some instances, functionally similar vehicles can be vehicles that are of a particular vehicle type (e.g., the same YMM, YMME, or YMMES). As an example, if the vehicle is a 2007 vehicle sold under the trademark CHEVY COBALT that has 75,000 miles, a future vehicle service can be repairing/replacing timing chain guides. Such a service can be noted, for instance, because data of a vehicle repair database indicates that timing chain guides usually wear out between 85,000 and 90,000 miles for 2007 vehicles sold under the trademark CHEVY COBALT. In other examples, functionally similar vehicles can be vehicles that have the same engine or powertrain. Examples of functionally similar vehicles can also include vehicles that are sister vehicles such as a 2008 vehicle sold under the trademark FORD EXPLORER and a 2008 vehicle sold under the trademark MERCURY MOUNTAINEER, or a 2002 vehicle sold under the trademark CHEVY CAMARO and a 2002 vehicle sold under the trademark PONTIAC FIREBIRD, etc.

In further examples, the method 200 can also include receiving from the communication network estimate information associated with one or more related parts or services. For instance, if the estimate information identifies a potential vehicle fix that involves removing and replacing a particular part of the vehicle, the estimate information may also include information identifying one or more parts and/or services that are related to the particular part. As an example, the related parts may be parts that are of the same system of the vehicle as the particular part or parts that are connected to the particular part. For instance, the particular part may be a water pump and the related parts may include a water hose.

As another example, the related services may be services that may be performed more efficiently when performed in conjunction with the potential vehicle fix than when performed individually. For instance, if the potential vehicle fix is replacing a water pump that involves removing one or more components of the vehicle to access the water pump, a related service may be replacing a timing belt that also involves removing the same components of the vehicle. In some cases, the estimate information received from the communication network may include a cost comparison that indicates a cost of performing the related service in conjunction with the potential vehicle fix and a cost of performing the related service independently of the potential vehicle fix (e.g., during a separate repair to be performed at a later date). That is, the computing device may receive data from the communication network that is indicative of: a repair cost associated with performing the potential vehicle fix and the related service during a single repair; and a repair cost associated with performing the potential vehicle fix and the related service during separate repairs.

Figure 3A:
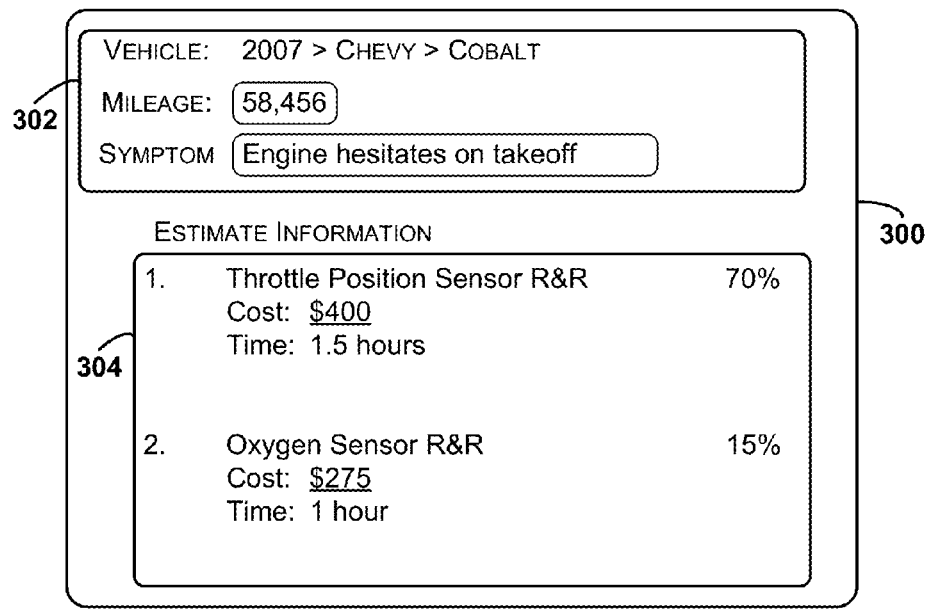
Figure 3B:
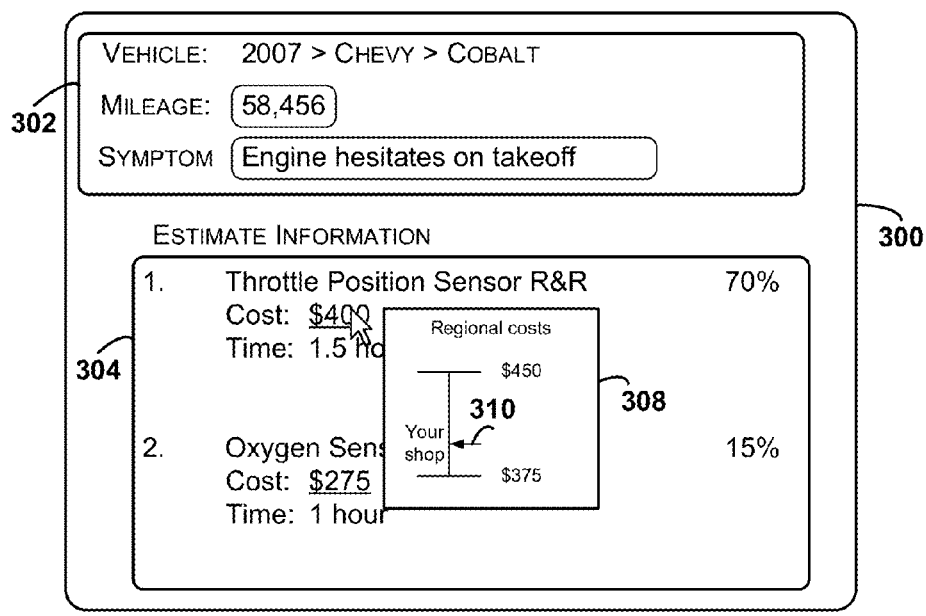

FIGS. 3A and 3B are conceptual illustrations of features of an example interface 300 of a computing device. For instance, the example interface 300 can be an interface of a computing device that is performing the method 200 of FIG. 2. In one example, the interface 300 can be a web-based interface that is provided within a webpage. In another example, the interface 300 can be an application interface of an application executing on a computing device.

In one instance, a service writer can specify vehicle information 302 via the interface 300. By way of example, the interface 300 displays vehicle information 302 that includes a vehicle identifier (2007 vehicle sold under the trademark CHEVY COBALT), mileage (58,456), and symptom (engine hesitates on takeoff). In response to requesting estimate information related to the vehicle information 302, estimate information 304 can be received and provided for display via the interface 300.

As shown in FIG. 3A, the estimate information 304 can include one or more potential vehicle fixes for the vehicle. In the example of FIG. 3A, two potential vehicle fixes are shown: Throttle Position Sensor R&R and Oxygen Sensor R&R. R&R can refer to remove and replace. For each of the potential vehicle fixes, a repair cost and repair time are provided.

As further shown in FIG. 3A, in some examples, estimate information can include a successful fix percentage corresponding to each potential vehicle fix. By way of example, the Throttle Position Sensor R&R is indicated to have a successful fix percentage of 70%. In one instance, a successful fix percentage of 70% can be interpreted by a service writer to mean that out of all known 2007 vehicles sold under the trademark CHEVY COBALT having around 58,000 miles and exhibiting a symptom of engine hesitating on takeoff, the symptom was successfully resolved by performing the Throttle Position Sensor R&R service. Further information about the successful fix percentages is described below with reference to FIG. 5.

As shown in FIG. 3B, according to one example embodiment, when a user hovers over or otherwise selects a repair cost for a vehicle fix, a range of repair costs 308 can be provided for display via the interface 300. An example method for determining a range of repair costs that can be executed by the server 104 of FIG. 1, for example, is further described below with reference to FIG. 7. In the example shown in FIG. 3B, when a user hovers a pointer over the cost of the Throttle Position Sensor R&R service, a range of repair costs is displayed. In one instance, the range of repair costs can be determined based on costs that repair shops within a predetermined range of a geographic location of a particular repair shop have reported for performing the service on 2007 vehicles sold under the trademark CHEVY COBALT. In another instance, the range of repair costs can be determined based on costs that repair shops across an entire country have reported for performing the service on 2007 vehicles sold under the trademark CHEVY COBALT.

Additionally, an indicator 310, which illustrates how an estimate for performing a particular repair at a particular repair shop compares to prices that customers paid at other repair shops, can also be provided for display via the interface 300. The other repair shops may be repair shops within a predetermined range of a geographic location of the particular repair shop, for instance.

Other implementations are also possible, and the example shown in FIG. 3B is not meant to be limiting. Although the range of repair costs 308 is illustrated as a graphic overlaying the interface 300, in other instances, a range of repair costs can be provided adjacent to the estimate information 304 (e.g., beside, above, below) or provided in a separate display window.

Figure 4A:
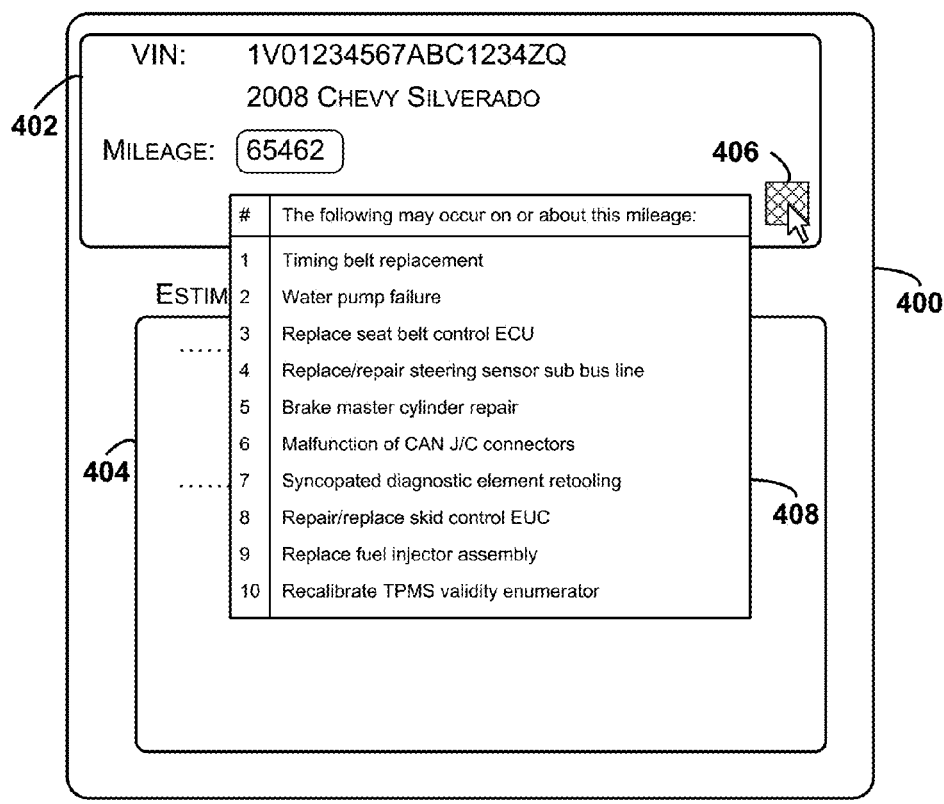

FIGS. 4A-4C are conceptual illustrations of features of another example interface 400 of a computing device. In one instance, the interface 400 can be an interface of a computing device that is performing the method 200 of FIG. 2. As shown in FIG. 4A, a service writer can specify vehicle information 402 via the interface 400. By way of example, the vehicle information 402 illustrated in FIG. 4A includes a vehicle identifier (VIN) and mileage (65462). Note that the YMM of the vehicle can be automatically determined by decoding the VIN using the client device 102. Estimate information 404 is also provided for display via the interface 400.

Additionally, the interface 400 shown in FIG. 4A illustrates a feature that can allow a service writer to determine information about future vehicle services to the vehicle. In one case, when a user hovers over or otherwise selects a prognostics icon 406 of the interface 400, vehicle usage-related problems for the type of vehicle specified are shown in a prognostics window 408. For example, the prognostics window 408 displays a list of future vehicle services that have been reported for 2008 vehicles sold under the trademark CHEVY SILVERADO having about or around 65,000 miles. In one example, the vehicle services of the prognostics window 408 are displayed in ascending order by frequency. For instance, "Timing belt replacement" can be the service that has been reported to have been performed most often while "Recalibrate TPMS (tire pressure monitoring system) validity enumerator" can be the service that has been reported to have been performed the least often. An example method for determining future vehicle services is described below with reference to FIG. 8.

In some examples, the interface 400 can allow a user to click on or otherwise select a particular vehicle service to display more information about the particular vehicle service. By way of example, FIG. 4B illustrates a vehicle service description window 410 that can be provided via the interface 400 of FIG. 4A. In one instance, the vehicle service description window 410 can be provided in a window that overlays the interface 400. In other instances, the vehicle service description window 410 can be provided in a separate display window. The vehicle service description window 410 provides information related to the "Timing belt replacement" vehicle service, such as a repair cost, repair time, description of the problem, and consequence of the problem.

In some examples, the interface 400 may also allow a service writer to record a vehicle owner's comments about one or more of the future vehicle services. For example, if a vehicle owner indicates that they are interested in performing one or more of the future vehicle services in the future, a service writer can highlight or otherwise select the future vehicle service(s). The interface 400 may also generate a reminder that may trigger the service writer to remind the vehicle owner about the selected future vehicle service at a later date.

FIG. 4C shows another example prognostics window 412 that can be provided in response to a user selecting the prognostics icon 406 from the interface 400. Note that selecting the prognostics icon 406 is just one example of a method to cause an interface to provide the prognostics window 412. In other instances, the prognostics window 412 may be provided in response to a service writer inputting vehicle information that includes a vehicle identifier and vehicle-usage data.

The prognostics window 412 lists the top pattern failures for a vehicle (2008 vehicle sold under the trademark CHEVROLET IMPALA). The pattern failures can be sorted in order of most frequently reported pattern failures. Alternatively, the pattern failures can be sorted alphabetically. For each of the failures, a histogram is provided. The histogram can be determined based on vehicle-usage data collected from other repair orders of a vehicle repair database. For instance, a histogram for the "tie rod end" failure may be determined by identifying all repair orders of the vehicle repair database that involved repairing the tie rod end on a 2008 vehicle sold under the trademark CHEVROLET IMPALA and sorting the identified repair orders into bins based on reported odometer readings. In the example of FIG. 4C, each bin represents a 10,000 mile range. That is, a first bin is 0-10,000 miles, a second bin is 10,001 20,000 miles, a third bin is 20,001-30,000 miles, etc. In other examples, other increments may be used. The histograms can be normalized histograms. That is, the height of each bin may correspond to a percentage.

Additionally, a mode of each histogram is easily identifiable in the prognostics window 412. By way of example, the mode of each histogram is shown by a bin that is shaded. In practice, the mode of each histogram may be displayed in a different color than other bins of the histograms such that the mode is easily identifiable to a user. Further, as shown in FIG. 4C, a vehicle-usage indicator 414 can be displayed. The vehicle-usage indicator 414 indicates vehicle-usage data for a particular vehicle. In some embodiments, a user may choose one or more vehicle services to create an estimate for or add to an existing estimate based on a relationship between the vehicle-usage indicator and one or more modes of the histograms. For instance, since the histogram for the "ball joint" failure indicates that ball joints are usually repaired between 30,000 and 40,000 miles, a service writer may check a check-box next to the "ball joint" failure. In response to the service writer selecting the check-box, an estimate for repairing the ball joint may be determined. Alternatively, the estimate for repairing the ball joint may be added to an existing estimate.

In other examples, additional types of prognostics information can be provided. For instance, a user can select one or more tabs 416 to cause other prognostics information to be shown. By way of example, the additional prognostics information may include the top DTCs reported for a particular vehicle type or the top symptoms reported for a particular vehicle type. The other prognostics information can also be graphically represented using histograms similar to the histograms shown in FIG. 4C. Other examples are also contemplated.

Figure 5:
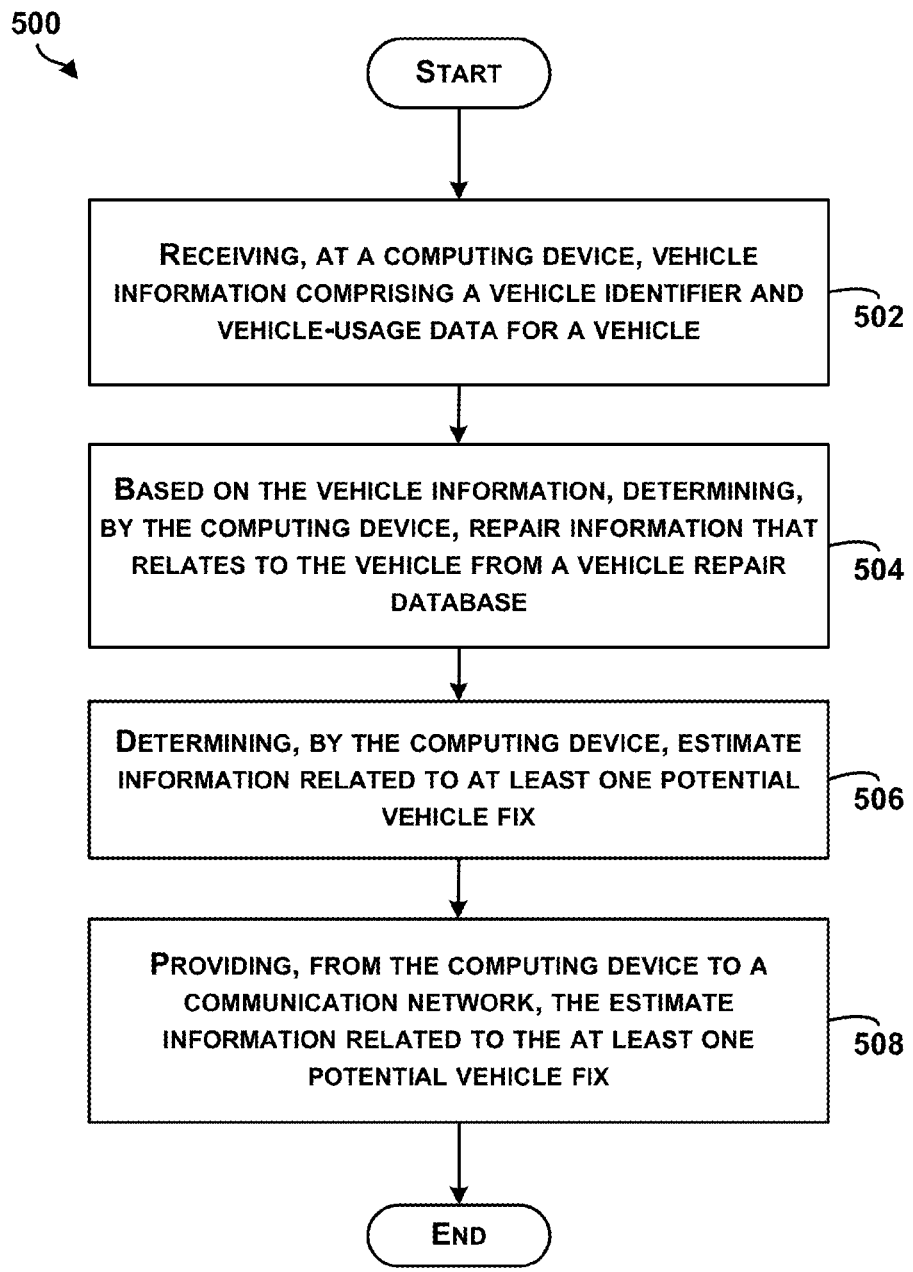
FIG. 5 is a block diagram of another example method for determining estimate information.

Turning now to FIG. 5, FIG. 5 is a block diagram of another example method 500 for determining estimate information. Method 500 shown in FIG. 5 presents an embodiment of a method that could be used or implemented by the server 104 of FIG. 1, for example, or by components of the server 104 of FIG. 1, or more generally by any of a variety of computing devices. Method 500 can include one or more operations, functions, or actions as illustrated by one or more of blocks 502-508. Although the blocks are illustrated in a sequential order, these blocks can also be performed in parallel, and/or in a different order than those described herein. Also, the various blocks can be combined into fewer blocks, divided into additional blocks, and/or removed based upon the desired implementation. Each block can represent a module, a segment, or a portion of program code, which includes one or more instructions executable by a processor for implementing specific logical functions or steps in the processor. In addition, each block in FIG. 5 can represent circuitry that is wired to perform specific logical functions in the process.

Initially, at block 502, the method 500 includes receiving, at a computing device, vehicle information comprising a vehicle identifier and vehicle-usage data for a vehicle. In one instance, the computing device can be a server that receives data indicating the vehicle information from a client computing device (e.g., a computing device at a repair shop).

In one example, the vehicle identifier can identify a particular vehicle. For instance, the vehicle identifier can be a VIN. In another example, the vehicle identifier can identify a particular vehicle type. For instance, the vehicle identifier can include a YMM, YMME, or YMMES. The vehicle-usage data can be an odometer reading or an hour meter reading, for example.

The vehicle information can also include or accompany symptom information. Alternatively, the symptom information can be transmitted or received separate from the vehicle information. The symptom information can identify a condition of the vehicle as reported by a customer, for example. As an example, the symptom information can indicate a symptom that is exhibited by the vehicle and/or reported by a vehicle owner such as "engine hesitates on takeoff", "poor acceleration", etc. In some instances, the vehicle information can further include one or more DTCs or information identifying that a malfunction lamp indicator of the vehicle is illuminated.

In some examples, the computing device can also receive repair shop information identifying a particular repair shop. For instance, if a service writer sends the vehicle information to the computing device from a client computing device at a particular repair shop, information identifying the particular repair shop and/or the client computing device of the particular repair shop can also be provided. The repair shop information can include a unique repair shop ID, repair shop name, client computing device ID, etc. The computing device can use the repair shop information to facilitate providing estimate information to the client computing device. The computing device can also use the repair shop information to facilitate determining customized estimate information.

At block 504, the method 500 includes based on the vehicle information, determining, by the computing device, repair information that relates to the vehicle from a vehicle repair database. As described above, the vehicle repair database can store a plurality of repair orders that each include information pertaining to repairing a vehicle and/or preforming preventative maintenance. By way of example, a repair order can include a combination of any of a service provider identifier, a date of service identifier, a customer indicator that indicates a customer seeking service of a given vehicle, vehicle information that indicates the given vehicle, a service request indicating the complaint or service requested by the customer, parts information indicating parts obtained for servicing the given vehicle, and service procedure information carried out on the given vehicle. In one embodiment, repair orders can be stored in local computing systems of repair shops and can be backed up and transmitted to the vehicle repair database on a frequent basis (e.g., hourly, daily, weekly, etc.).

In one example, the computing device can be configured to match the vehicle information with content of the vehicle repair database so as to identify repair orders relating to the vehicle information. Matching the received vehicle information to repair orders of the vehicle repair database can include searching or querying the vehicle repair database to correlate the vehicle identifier, mileage, DTCs, and/or symptom information with content of repair orders of the vehicle repair database. In one instance, a combination of YMM, YMME, or YMMES and mileage can be used to filter repair orders of the vehicle repair database. Subsequently, the identified repair orders can be further filtered based on keywords of the symptom information matching keywords of the identified repair orders or based on one or more DTCs. The vehicle repair database can also be configured or arranged to facilitate matching the received vehicle information to one or more repair orders.

In an example in which the computing device also receives repair shop information, the content of the vehicle repair database can also optionally be filtered based on a geographic location of a particular repair shop that provides the vehicle information. For example, the computing device can be configured to identify repair orders matching the vehicle information and associated with repair shops that are located within a predetermined geographical range of the particular repair shop (e.g., within 25 miles, 100 miles, etc.) or located within the same city as the particular repair shop.

Based on content of the vehicle repair database matching the vehicle information, the computing device can determine the repair information. The repair information can include at least one potential vehicle fix to a given malfunction. In one example, to determine the potential vehicle fix(es), the computing device can identify repair orders of the vehicle repair database that match the vehicle information, and identify the service performed according to each repair order. The computing device can then determine, from among the identified repair orders, the most frequently performed services. In another example, the vehicle repair database may store predetermined repair information that is organized (e.g., grouped together or categorized) by vehicle information. To determine the repair information, the computing device can perform a data-lookup keyed to the vehicle information. For instance, given a vehicle identifier and mileage of a particular vehicle, the computing device can retrieve from the vehicle repair data base a list of predetermined repair information for the particular vehicle. By way of example, the predetermined repair information may identify the most frequently performed services for the particular vehicle (e.g., the top ten most frequently performed services, the top five most frequently performed services, etc.). In other examples, the predetermined repair information may identify any services for the particular vehicle that have been performed more than a predetermined number of times (e.g., any services that have been performed more than fifty times, any services that have been performed more than one hundred times, etc.).

In some examples, the repair information can also include a successful fix percentage associated with symptom information. In one instance, the successful fix percentage associated with a particular vehicle fix can be determined based on the number of similar vehicles reporting the symptom information that were successfully fixed by the particular vehicle service. For example, if the vehicle information is a 2007 vehicle sold under the trademark CHEVY COBALT having 50,000 miles and a symptom of "engine hesitates on takeoff", the computing device can identify one hundred repair orders for 2007 vehicles sold under the trademark CHEVY COBALT having between 40,000 and 60,000 miles and a symptom similar to "engine hesitates on takeoff". The computing device can also determine that of the one hundred identified repair orders, seventy of the repair orders indicate that the throttle position sensor was replaced. The successful fix percentage provided for the throttle position sensor R&R service can therefore be 70%. In some instances, if the computing device is unable to identify more than a threshold number of repair orders corresponding to a mileage of the vehicle, the mileage range may be expanded or even not used as a filtering term.

At block 506, the method 500 includes determining, by the computing device, estimate information related to at least one potential vehicle fix. In one example, the computing device can estimate a repair time and/or repair cost associated with any of the potential vehicle fixes that have been determined. The repair cost may include any costs associated with performing the at least one potential vehicle fix. In one instance, the computing device can determine a repair time for a potential vehicle fix based on a database of service labor time standards. The database of service labor time standards can include benchmarks for time required to perform various vehicle services/repairs.

In some examples, the computing device can estimate a repair cost by multiplying an estimated repair time (e.g., a benchmark repair time) by a shop labor rate. The shop labor rate can be a labor rate of a particular repair shop. For example, if the computing device receives or otherwise determines repair shop information, the computing device can identify a shop labor rate for the particular repair shop. The computing device can select the labor rate from a plurality of rates the particular repair shop uses (e.g., normal hours rate, after hours rate, holiday rate, weekend rate, senior citizen rate, etc.). In one instance, the computing device can receive an indication of which labor rate to use along with the repair shop information. For example, the computing device may receive data identifying which labor rate to use when receiving the repair shop information, and based on the data, identify the appropriate labor rate. Additional costs such as costs for parts or disposal of materials can also be factored into the repair cost. To determine the cost of parts or disposal of materials, the computing device can access one or more electronic parts catalogs (EPCs) or access a table in the vehicle repair database that stores information regarding prices for parts and disposal of materials.

In other examples, the vehicle repair database may store predetermined estimate information for a plurality of vehicle fixes, and the computing device can determine the estimate information by performing a data-lookup keyed to a potential vehicle fix.

In some examples, the computing device can also determine a range of repair costs for one or more of the potential vehicle fixes. For example, the computing device can determine a range of repair costs based on costs reported for a group of repair orders. In one example, the repair orders can be repair orders for repair shops that are in the same city as a particular repair shop or within a geographical range of the particular repair shop. This information can enable a service writer of the particular repair shop to see how an estimated repair cost compares to a price that competitor repair shops can charge for the same vehicle fix.

In other examples, the computing device can also determine the repair time based on a shop work load of a particular repair shop. For instance, the computing device may access a repair shop schedule to determine how many vehicles are currently being serviced and when the service for the vehicles is scheduled to be completed (such that a service technician would be available to perform the repair). Additionally or alternatively, the computing device may determine whether any parts required for the repair are available (based on an inventory of the repair shop). If one or more parts are unavailable, the computing device may incorporate an estimated shipping time for obtaining the unavailable parts into the estimated repair time. At block 508, the method 500 includes providing, from the computing device to a communication network, the estimate information related to the at least one potential vehicle fix. In one instance, the estimate information can be provided to a client computing device of a repair shop via the communication network, such that a service writer can prepare an estimate for a vehicle owner. For example, a service writer can use the estimate information to seek preapproval for performing one or more potential vehicle fixes if a service technician determines that a vehicle fix should be performed to resolve the symptom exhibited by the vehicle owner's vehicle.

In some examples, the computing device can also determine estimate information associated with replacing one or more parts that are related to a potential vehicle fix or performing services that are related to a potential vehicle fix. For instance, if the estimate information identifies a potential vehicle fix that involves removing and replacing a particular part of the vehicle, the computing device can also determine a repair time and/or repair cost of: removing and replacing one or more parts that are related to removing and replacing the particular part; and/or performing one or more related services that are related to removing and replacing the particular part.

As an example, the related part(s) may be part(s) that are of the same system of the vehicle as the particular part or parts that are connected to the particular part. As another example, the related service(s) may be service(s) that can be performed more efficiently when performed in conjunction with the potential vehicle fix than when performed individually. As yet another example, the related part(s) may be part(s) in proximity to the particular part. As yet another example, the related part(s) may be part(s) that are accessible for replacement without removing any other parts while accessing the particular part for replacement.

As yet another example, the related part(s) may be part(s) that are accessible for replacement after removing only a minimal number of additional parts while accessing the particular part for replacement. The minimal number of parts could, for example, be 1, 2, 3, 4, 5, 6, 7, 8 or some other number of parts. The computing device can be configured to select or the vehicle repair database may specify the minimal number of parts based on an amount of time specified for removing and replacing the particular part. In accordance with at least some example embodiments, the selected minimal number of parts is greater as the amount of time to remove and replace the particular part increases.

As yet another example, the related part(s) may be part(s) that are accessible for replacement by performing tasks that require less than a minimal amount of time while accessing the particular part for replacement. The minimal amounts of time used by the computing device could be based on tenths of hours, where each one tenth of an hour equals six minutes. The minimal amount of time could, for example, be 1, 2, 3, 4, 5, 6, 7, 8 or some other number of tenths of hours. The computing device can be configured to select or the vehicle repair database may specify the minimal number of tenths of hours based on an amount of time specified for removing and replacing the particular part. In accordance with at least some example embodiments, the selected minimal number of tenths of hours is greater as the amount of time to remove and replace the particular part increases.

In one example, the vehicle repair database may store information regarding parts and/or services that are related to vehicle fixes. To determine parts and/or services that are related to a particular vehicle fix, the computing device can perform a data-lookup keyed to the particular vehicle fix.

Figure 6:
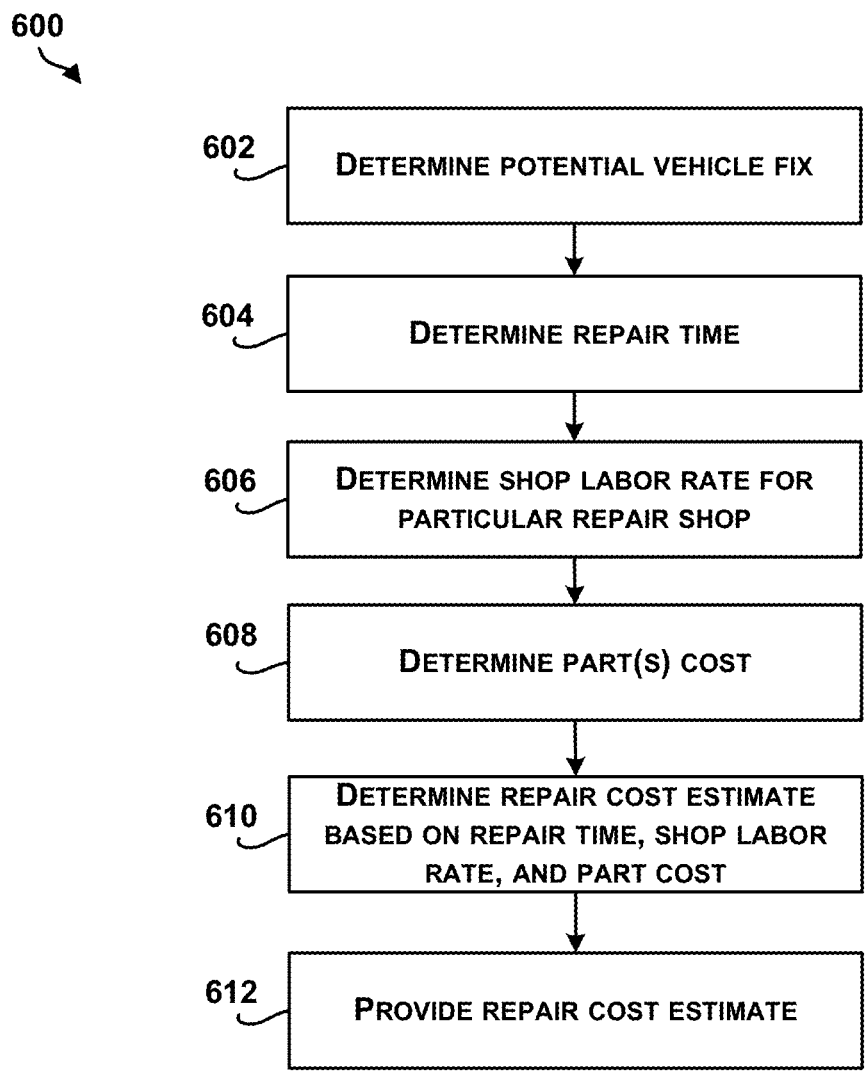
FIG. 6 is a flow chart of an example method for determining repair cost information for a particular repair shop.

As described briefly above, in some examples, the computing device performing the method 500 can determine a repair cost estimate that is specific to a particular repair shop. FIG. 6 is a flow chart of an example method 600 for determining repair cost information for a particular repair shop. Each block of the method 600 can be carried out by a computing device, such as the server 104 of FIG. 1. As shown in FIG. 6, at block 602, a potential vehicle fix can be determined. Such a potential vehicle fix can be determined based on content of a vehicle repair database that matches vehicle information for a vehicle. Given the potential vehicle fix, at block 604, the computing device can determine a repair time for the potential vehicle fix. For instance, the computing device can access a database of service labor time standards to determine an appropriate repair time. As an example, the potential vehicle service can be "Replace mass air flow sensor" and the approved repair time for a service technician to replace the mass air flow sensor, according to service labor time standards, can be one and half hours.

Additionally, at block 606, a shop labor rate for the particular repair shop can be determined. In one example, the computing device can access a user account for the particular repair shop in a user account database. The user account can indicate the shop labor rate for the particular repair shop (e.g., 75$/hour).

Further, at block 608, a part cost for any parts associated with the potential vehicle fix may be determined. For instance, a cost of one or more parts (e.g., a cost of a mass air flow sensor for a particular vehicle) may be determined by querying one or more EPCs.

Subsequently, at block 610, to determine a repair cost estimate, the computing device can multiply the determined repair time by the determined shop labor rate to calculate a labor cost. The labor cost may then be combined with the part cost to determine the repair cost estimate. After the repair cost estimate has been determined, at block 612, the computing device can provide the repair data cost estimate to a client computing device via a communication network.

Figure 7:
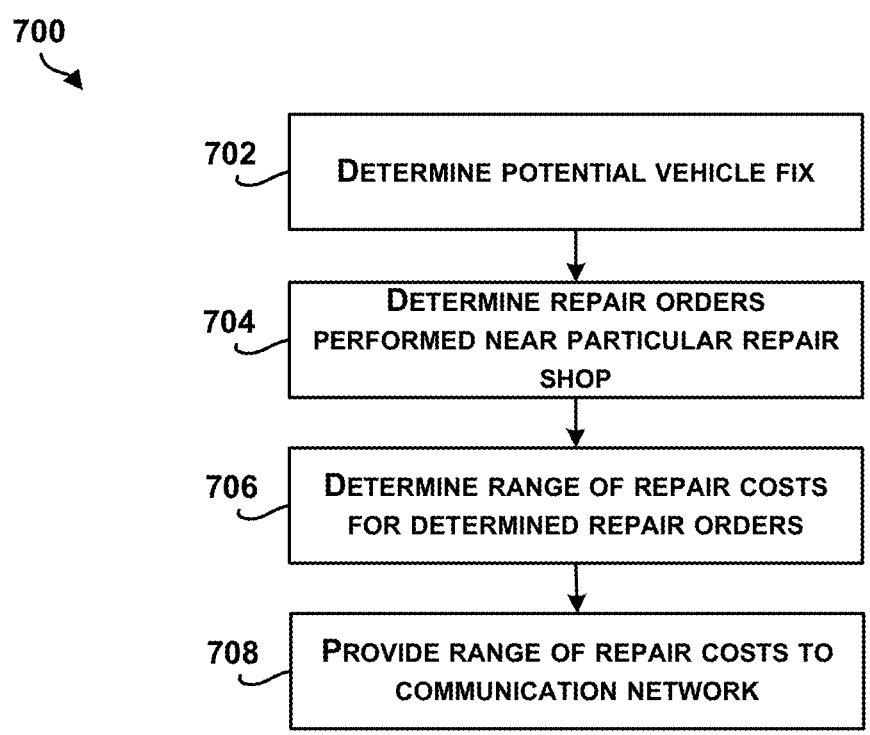
FIG. 7 is a flow chart of an example method for determining a range of repair costs.

In other examples, as part of the method 500, the computing device can determine a customized range of repair costs for a particular repair shop. FIG. 7 is a flow chart of an example method 700 for determining a range of repair costs. Each block of the method 700 can be carried out by a computing device, such as the server 104 of FIG. 1. Initially, at block 702, the computing device can determine a potential vehicle fix. For example, a vehicle fix can be determined based on vehicle information received by the computing device and content of a vehicle repair database.

At block 704, the computing device can determine repair orders performed near a location of a particular repair shop. In one example, the computing device can receive repair shop information along with a request for estimate information related to a particular vehicle or vehicle type. Based on an identity and location of the particular repair shop, the computing device can identify repair orders for the potential vehicle fix that were performed at repair shops near a location of the particular repair shop. In one example, the other repair shops can be repair shops that are located in the same city as the particular repair shop. In another example, the other repair shops can be repair shops that are located within a predetermined range of the particular repair shop (e.g., 25 miles, 100 miles, a zipcode range, etc.).

After identifying repair orders associated with a potential vehicle fix that were performed near a particular repair shop, at block 706, the computing device can determine a range of repair costs. The computing device can determine the range of repair costs by identifying the maximum and minimum repair costs specified by the repair orders. The determined range of repair costs can then be provided to a client computing device via a communication network at block 708.

Figure 8:
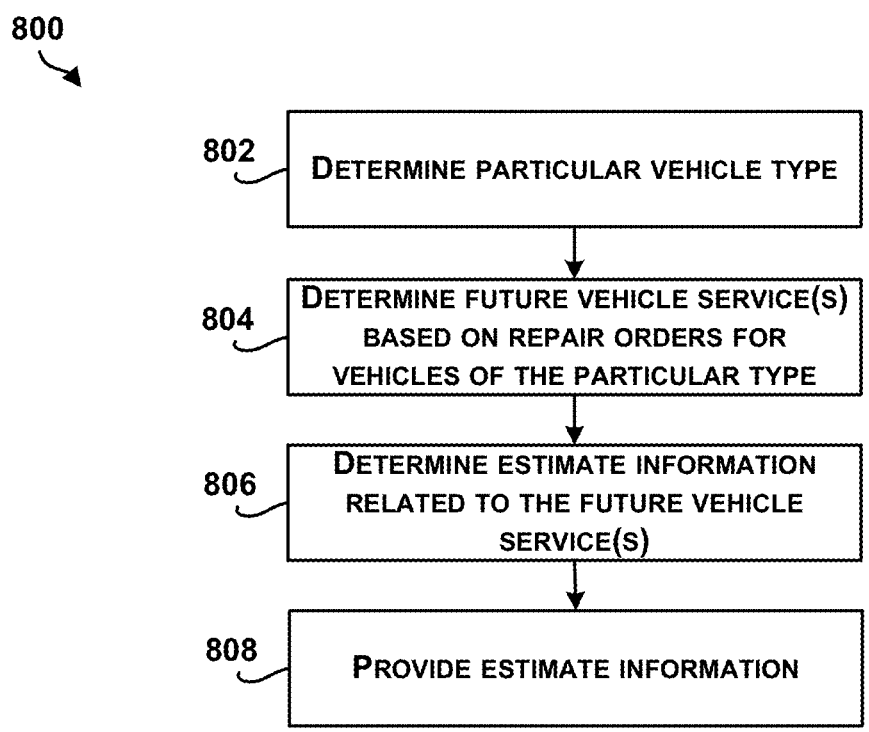
FIG. 8 is a flow chart of an example method for determining one or more future vehicle services.

In still other examples, as part of the method 500, the computing device can also determine one or more future vehicle services that may need to be performed for a particular vehicle or vehicle type. FIG. 8 is a flow of an example method 800 for determining one or more future vehicle services. Each block of the method 800 can be carried out by a computing device, such as the server 104 of FIG. 1. As shown in FIG. 8, initially, at block 802, the computing device can determine a particular vehicle type. In one example, if the vehicle information received by the computing device is a VIN, the computing device can decode the VIN to determine a YMM, YMME, or YMMES.

In other examples, the vehicle information can explicitly identify a YMM, YMME, or YMMES.

At block 804, the computing device can determine one or more future vehicle service(s) for the particular vehicle type based on repair orders for vehicles of the particular type and/or recommended services that are identified by a manufacturer. The repair orders can be data that represents failure trends for vehicles. For instance, the repair orders can indicate which parts of a particular vehicle type need to be repaired over time, and an average mileage or range of mileage when each part is repaired.

To determine the future vehicle service(s) the computing device can identify repair orders matching the particular vehicle type and performed within a range of miles of the odometer reading of a vehicle. To determine the range of miles, the computing device may subtract a predetermined number of miles from the mileage to determine a minimum and add a predetermined number of miles to the mileage to determine a maximum. If the odometer reading is 56,123 miles, for example, the range of miles can be 41,123 miles to 71,123 miles. Thus, the computing device can identify repair orders for the particular vehicle type with a reported mileage of between 41,123 miles and 71,123 miles. Alternatively, the computing device may identify which of a plurality of predetermined mileage ranges that the mileage corresponds to. For instance, if the predetermined ranges are 0 to 25,000 miles, 25,000 miles to 50,000 miles, 50,000 to 75,000 miles, and so on at 25,000 mile increments, the computing device may determine that the mileage range is 50,000 to 75,000 miles.

At block 806, the computing device can determine estimate information related to the one or more future vehicle services. The estimate information can include a repair time and/or repair cost and can be determined in a similar manner as the determination of estimate information described above with respect to block 506 of FIG. 5. Data identifying the estimate information and the future vehicle service(s) can also be provided to a client computing device via a communication network at block 808.

Figure 9:
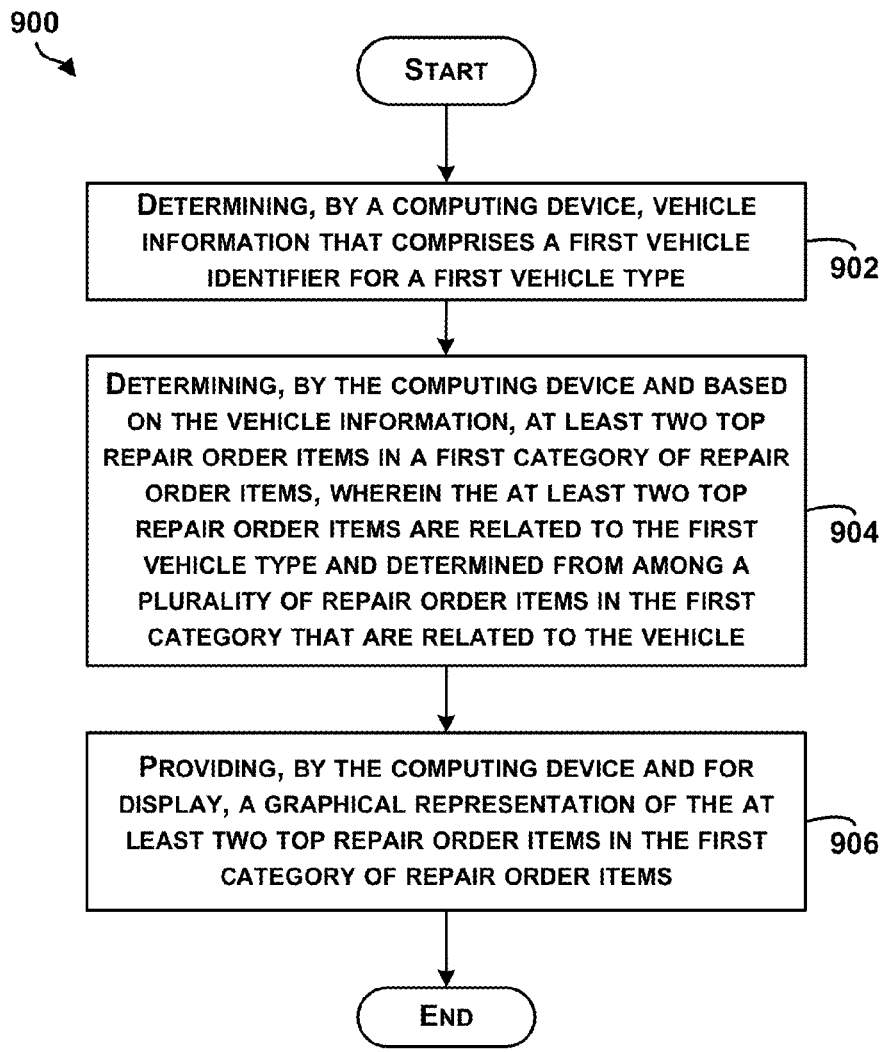
FIG. 9 is a block diagram of an example method for determining potential-repair information.

As discussed briefly above, one or more client devices may interact with a vehicle-diagnostic record when diagnosing a root cause of a vehicle malfunction and when determining estimate information for a repair. Turning now to FIG. 9, FIG. 9 is a block diagram of an example method 900 for determining potential-repair information. Each block of the method 900 can be carried out by a computing device, such as one of the client devices 102 of FIG. 1.

As shown in FIG. 9, at block 902, the method 900 includes, determining, by a computing device, vehicle information that comprises a first vehicle identifier for a first vehicle type. In one instance, the computing device can be a client device that accesses or receives a vehicle-diagnostic record that indicates the vehicle information. In line with the discussion above, the vehicle-diagnostic record may correspond to a particular vehicle. Further, the vehicle-diagnostic record can include the first vehicle identifier. As one example, the first vehicle identifier can be a VIN that in turn identifies the first vehicle type. Alternatively, the first vehicle identifier can be a generic identifier of the first vehicle type. For instance, the first vehicle identifier can be a YMM, YMME, or YMMES. Other types of vehicle identifiers are also possible, depending on the type of vehicle.

In one embodiment, a client device that is used by a service technician at a repair shop can access a vehicle-diagnostic record that is maintained by a server to determine the vehicle information. By way of example, a service technician can input to the client device a vehicle ID (e.g., a unique identification that is assigned to a particular vehicle when a vehicle is brought in to a repair shop). Using the vehicle ID, the client device can then access a vehicle-diagnostic record that corresponds to the vehicle ID.

In another embodiment, the client device can receive a vehicle-diagnostic record from another device. For instance, rather than accessing a vehicle-diagnostic record stored and maintained by a server, the client device can receive a copy of the vehicle-diagnostic record from another client device or from a server. In this scenario, the vehicle-diagnostic record may again include a vehicle ID that is a unique identification assigned to a particular vehicle by a repair shop. In this manner, if the client device receives multiple vehicle-diagnostic records, a service technician can differentiate each of the vehicle-diagnostic records using the corresponding vehicle IDs.

At block 904, the method 900 includes, determining, by the computing device and based on the vehicle information, at least two top repair order items in a first category of repair order items. The at least two top repair order items in the first category of repair order items are related to the first vehicle type and determined from among a plurality of repair order items in the first category of repair order items that are related to the vehicle. As one example, the computing device may query a vehicle repair database through an application programming interface (API) or web-service to determine the at least two top repair order items in the first category of repair order items.

As described above, the vehicle repair database can store a plurality of repair orders that each include information pertaining to repairing a vehicle and/or performing preventative maintenance. By way of example, a repair order can include a combination of any of a service provider identifier, a date of service identifier, a customer indicator that indicates a customer seeking service of a particular vehicle, vehicle information that indicates the particular vehicle, a service request indicating the complaint or service requested by the customer, parts information indicating parts obtained for servicing the particular vehicle, and service procedure information carried out on the particular vehicle. In one embodiment, repair orders can be stored in local computing systems of repair shops and can be backed up and transmitted to the vehicle repair database on a frequent basis (e.g., hourly, daily, weekly, etc.).

In one example, the computing device can be configured to match the vehicle information with content of the vehicle repair database so as to identify repair orders relating to the vehicle information. In one instance, the repair orders of the vehicle repair database may be tagged or annotated such that the repair orders may be filtered or sorted. For instance, the vehicle repair database can include a table having records (e.g., rows) and fields (e.g., columns) that represent the repair orders. Each record of the table may correspond to a particular repair order and include data about the particular repair order. By way of example, a particular repair order can be represented by a row of field values for a plurality of fields. In such an implementation, the computing device can then identify a plurality of repair orders having a desired field value by filtering or sorting based on the field. The repair orders of the vehicle repair database may be tagged or annotated in other manners as well. Thus, the example is not meant to be limiting. Additionally, individual repair orders of the vehicle repair database may include repair order items. As with the repair orders, the repair order items may also be tagged or annotated such that the repair order items can be filtered or sorted. As an example, a particular repair order item may be represented in the vehicle repair database by a row of field values for a plurality of fields.

Matching the received vehicle information to repair orders of the vehicle repair database can include searching or querying the vehicle repair database to correlate the vehicle identifier with content of repair orders of the vehicle repair database. In one instance, a YMM, YMME, or YMMES can be used to filter repair orders of the vehicle repair database. Subsequently, the computing device can identify repair order items for a particular category of repair order items. For instance, if the category is repaired components, the computing device can identify any repaired components that are included in the repair orders related to a particular vehicle type. The computing device can then determine, from among the identified repaired components, the top repaired components (i.e., the repaired components that occur most often in the repair orders related to the particular vehicle type). By way of example, for each different type of repaired component, the computing device can determine a number of repair orders corresponding to the type of repaired component.

In some instances, each instance of a repaired component that corresponds to a unique part of a vehicle may be considered a different type of repaired component. Thus, if the repair orders related to a particular vehicle type indicate four instances in which a water pump has been replaced, the number of repair orders corresponding to the water pump may be four. Based on the respective number of repair orders corresponding to each different type of repair order, the computing device can determine the at least two top repaired components. For example, the computing device can rank each different type of repaired component from most number of corresponding repair orders to least number of corresponding repair orders, and select the two types of repaired components having the most corresponding repair orders.

In another example, the vehicle repair database may store predetermined repair information that is organized by vehicle information. To determine the potential-repair information, the computing device can perform a data-lookup keyed to the vehicle information. For instance, given a vehicle identifier of a particular vehicle type, the computing device can retrieve from the vehicle repair database a list of predetermined repair information for the particular vehicle type. By way of example, the predetermined repair information may identify the top repaired components for the particular vehicle type (e.g., the top ten repaired components, the top five repaired components, etc.).

In other examples, additionally or alternatively, the computing device can determine other types of repair order items related to the vehicle type. For instance, using the vehicle information, the computing device can determine at least two of the top reported DTCs related to the vehicle type. By way of example, given a plurality of repair orders corresponding to the vehicle type, the computing device can identify any DTCs reported in each repair order. The computing device can then determine, from among the identified repair orders, the top reported DTCs. In another implementation, the vehicle repair database may store predetermined repair information that is organized by vehicle information and includes the most frequently reported DTCs for each vehicle type. In this scenario, given the vehicle identifier, the computing device can retrieve from the vehicle repair database a list of the top reported DTCs for the vehicle type.

As another example, using the vehicle information, the computing device can determine at least two of the top reported symptoms related to the vehicle type. By way of example, given a plurality of repair orders corresponding to the vehicle type, the computing device can identify any symptoms reported in each repair order. The computing device can then determine, from among the identified repair orders, the top reported symptoms. In another implementation, the vehicle repair database may store predetermined repair information that is organized by vehicle information and includes the top reported symptoms for each vehicle type. In this scenario, given the vehicle identifier, the computing device can retrieve from the vehicle repair database a list of the top reported symptoms for the vehicle type.

As another example, using the vehicle information, the computing device can determine any technical service bulletins (TSBs) related to the vehicle type. By way of example, the vehicle repair database, or a separate database, may store TSBs organized by one or more vehicle identifiers that correspond to each TSB. Given a particular vehicle identifier, the computing device can then query the vehicle repair database or other database to retrieve any TSBs related to the vehicle type.

At block 906, the method 900 includes providing, by the computing device and for display, a graphical representation of the at least two top repair order items in the first category of repair order items. By way of example, the graphical representation may be any type of chart or graph. For instance, the chart or graph may identify the number of times that each of the top repair order items occurs. Alternatively, the chart or graph may identify a percentage of all of the repair order items related to the vehicle type that correspond to each particular repair order item, or perhaps a percentage of all of the at least two top repair order items that correspond to each particular repair order item. For instance, if the computing device provides a pie graph that is indicative of the five top repaired components, each pie slice of the graph may correspond to a particular repaired component, and the size of each pie slice may be proportional to the relative number of times each component is repaired. In other words, if the computing device identified the top five repaired components, and the top repaired component of the top five corresponds to twice as many repair orders as the second most frequently repaired component, the pie slice corresponding to the top repaired component may be twice the size of the pie slice corresponding to the second most frequently repaired component.

In some examples, the at least two top repair order items in the first category may be provided in an alternative manner was well. For instance, the computing device may provide a list of the at least two top repair order items in the first category, or multiple lists of at least two top repair order items in multiple respective categories.

In other examples, instead of or in addition to providing a graphical representation of the at least two top repaired components, the computing device can provide a list or graphical representation of the at least two top reported DTCs and/or symptoms related to the vehicle type. For instance, the computing device can provide a list of 3, 4, 5, 10, or more of the top reported DTCs and/or symptoms related to the vehicle type. Within the list, the DTCs and/or symptoms may be sorted by frequency of occurrence. Alternatively, the list may be sorted alphabetically. Optionally, the computing device can also provide a list of any TSBs related to the vehicle type.

In another example, rather than providing a graphical representation of the at least two top repaired components, the computing device can provide for display a list of the at least two top repaired components and provide for display a graphical representation of one or both of the at least two top reported DTCs and the at least two top reported symptoms.

In further examples, the method 900 can also include determining and providing a vehicle-usage profile for a particular repaired component, a particular DTC, and/or a particular symptom. For instance, in response to receiving a selection of a particular repaired component, DTC, or symptom, the computing device can determine a vehicle-usage profile corresponding to the selection and provide the vehicle-usage profile for display.

In one example, the vehicle-usage profile for the particular repaired component, particular DTC, and/or particular symptom may be indicative of a distribution of a plurality of repair orders over a plurality of vehicle-usage intervals. In particular, the plurality of repair orders may correspond to the particular vehicle type, as identified by the vehicle information, and the particular repaired component, particular DTC, or particular symptom. For instance, the vehicle-usage profile may be a histogram or similar type of graphical representation of the distribution.

In line with the discussion above, to determine the vehicle-usage profile, the computing device can identify vehicle-usage data for the plurality of repair orders that correspond to the particular vehicle type and the particular repaired component, particular DTC, or particular symptom. For instance, a vehicle-usage profile for a "Water Pump Remove and Replace" may be determined by identifying all repair orders of the vehicle repair database that involved repairing the water pump on a particular vehicle type. The computing device can then sort the identified repair orders into vehicle-usage intervals (e.g., bins) based on reported odometer readings, and provide a graphical representation of the distribution of repair orders over the plurality of vehicle-usage intervals.

FIGS. 10, 11, 12A, 12B, 12C, 13A, 13B, 13C, and 14 are conceptual illustrations of features of example interfaces of a computing device. In particular, FIGS. 10-14 are conceptual illustrations of example interfaces for interacting with a vehicle-diagnostic record. The example interfaces described with respect to FIGS. 10-14 are provided as examples only, and are not meant to be limiting. Other example interfaces are also possible.

FIG. 10 is a conceptual illustration of an example interface 1000 for inputting customer and vehicle information and for displaying estimate information. In one instance, a client device, such as a client device operated by a service writer, can provide the interface 1000. By way of example, the example interface 1000 can be a first window or tab that is used for inputting customer information or vehicle information for a vehicle-diagnostic record. Accordingly, the service writer or another user (e.g., a service technician) may use the interface 1000 to input the customer information or vehicle information. In one example, the service writer may input or look-up customer information and vehicle information when a customer brings a vehicle to a repair shop. For instance, the customer information may include a name, company, address, phone number or email address, and the vehicle information may include a YMM and VIN.

In one instance, the customer information and vehicle information may be input manually using an input interface of the client device. Alternatively, the customer information and vehicle information may be retrieved from a database of customer information using a customer's name. As still another example, the customer information and vehicle information can be retrieved by scanning a physical identifier (e.g., a bar-code or other identification code) that is located on or within a vehicle or a vehicle's key.

FIGS. 11-13C are conceptual illustrations of an example interface 1100 for displaying and selecting potential-repair information for a vehicle. In one instance, a client device, such as a client device operated by a service technician, can provide the interface 1100. By way of example, the example interface 1100 can be a second window or tab that is used for displaying potential-repair information of a vehicle-diagnostic record, and optionally selecting one or more potential vehicle fixes for a vehicle. For instance, after a service writer or service technician has input customer information and vehicle information, a service technician may use the interface 1100 to facilitate diagnosing a vehicle.

Figure 11:
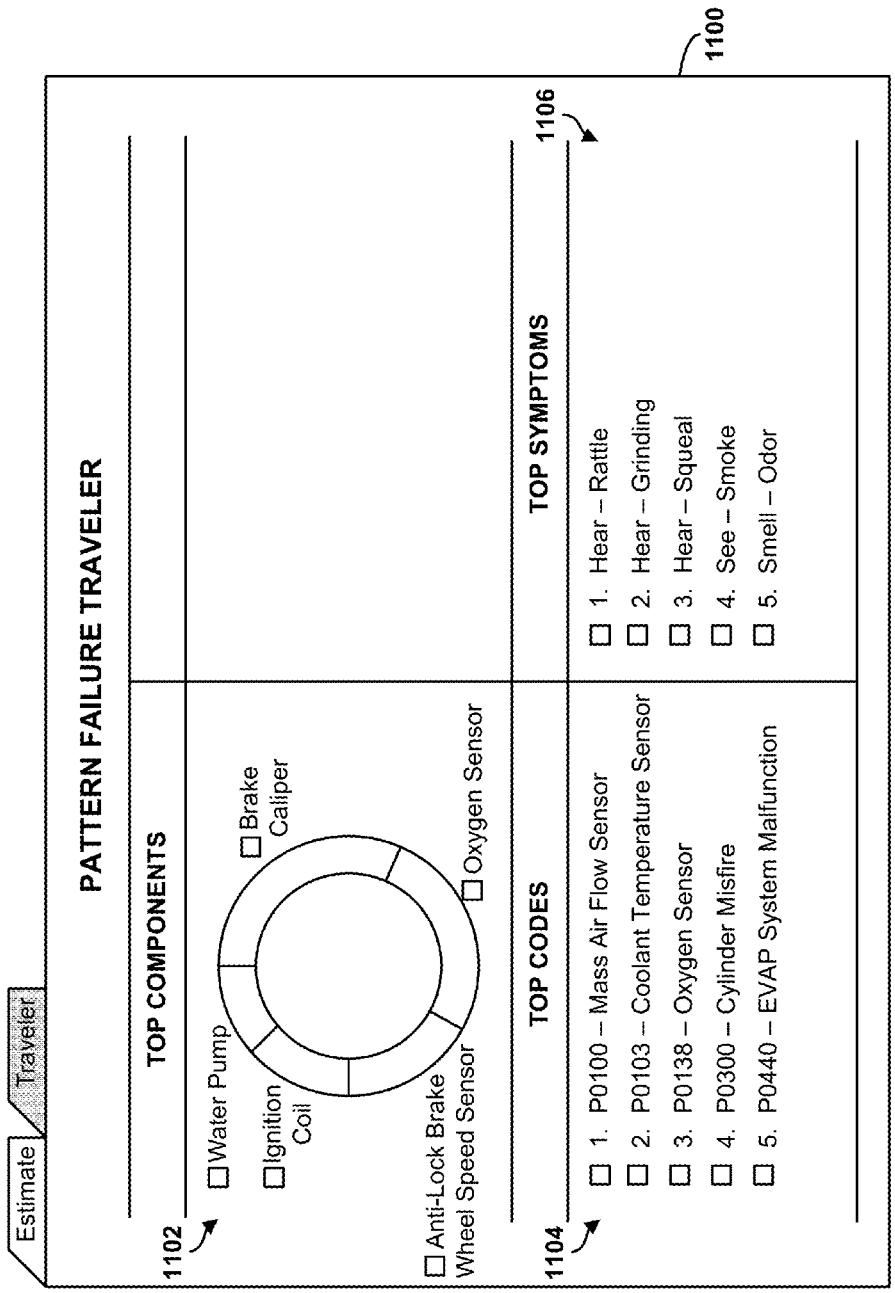

As shown in FIG. 11, in one example, the interface 1100 may be a pattern failure traveler that provides potential-repair information for a vehicle. In particular, the pattern failure traveler may include a graphical representation 1102 of top repaired components, a list 1104 of top reported DTCs, and a list 1106 of top reported symptoms.

The graphical representation 1102 of top repaired components includes a donut graph of the top five repaired components related to a particular vehicle type. For instance, the graphical representation identifies a brake caliper, oxygen sensor, anti-lock brake wheel speed sensor, ignition coil, and water pump. In one example, the relative size of each portion of the donut graph may be indicative of the relative number of repair orders that relate to the vehicle type and relate to a repaired component represented by the portion. In other words, according to the example in FIG. 11, the brake caliper may be the top repaired component while the water pump may be the fifth most frequently repaired component.

The list 1104 of top reported DTCs includes a list of the five top reported DTCs related to the particular vehicle. In one example, the list 1104 may be ordered based on frequency of occurrence. Thus, "P0100" may be the DTC that was reported the most number of times within all of the repair orders related to the particular vehicle type.

The list 1106 of top reported symptoms includes a list of the five top reported symptoms related to the particular vehicle. In one example, the list 1106 may be ordered based on frequency of occurrence. Thus, "Hear-Rattle" may be the symptom that was reported the most number of times within all of the repair orders related to the particular vehicle.

Figure 12A:
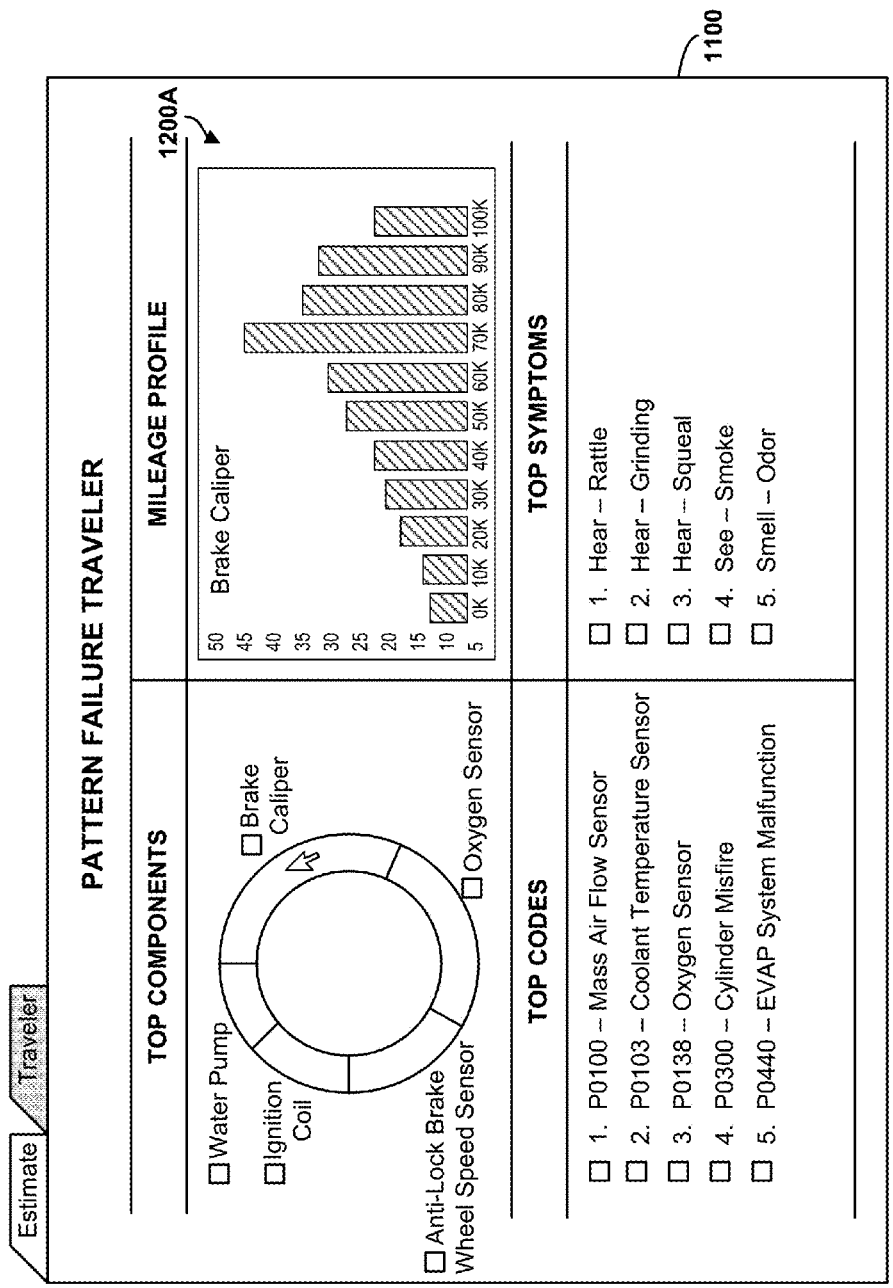

In one embodiment, a service technician may use the interface 1100 to facilitate diagnosing a vehicle. For instance, the service technician may view a vehicle-usage profile that is indicative of when a particular component is often repaired for the particular vehicle type by clicking-on, hovering-over, or otherwise selecting the particular component. As shown in FIG. 12A, if a computing device receives data indicating a selection of the brake caliper component, the computing device may provide a vehicle-usage profile 1200A for the brake caliper. By way of example, the vehicle-usage profile 1200A includes a histogram having a plurality of bins corresponding to a plurality of mileage intervals. In the example of FIG. 12A, each mileage interval represents a range of 10,000 miles. For instance, a first interval is 0-10,000 miles, a second interval is 10,001-20,000 miles, a third interval is 20,001-30,000 miles, etc. Looking at the vehicle-usage profile 1200A may provide the service technician with an estimate of whether or not a brake caliper is likely to need repaired, given the mileage of the particular vehicle the technician is diagnosing. For instance, if the particular vehicle has over 60,000 miles, in light of the vehicle-usage profile 1200A, the service technician may wish to check whether the brake calipers need to be replaced.

Similarly, a service technician may view a vehicle-usage profile that is indicative of when a particular DTC is reported for the particular vehicle type by selecting a particular DTC.

Figure 12B:
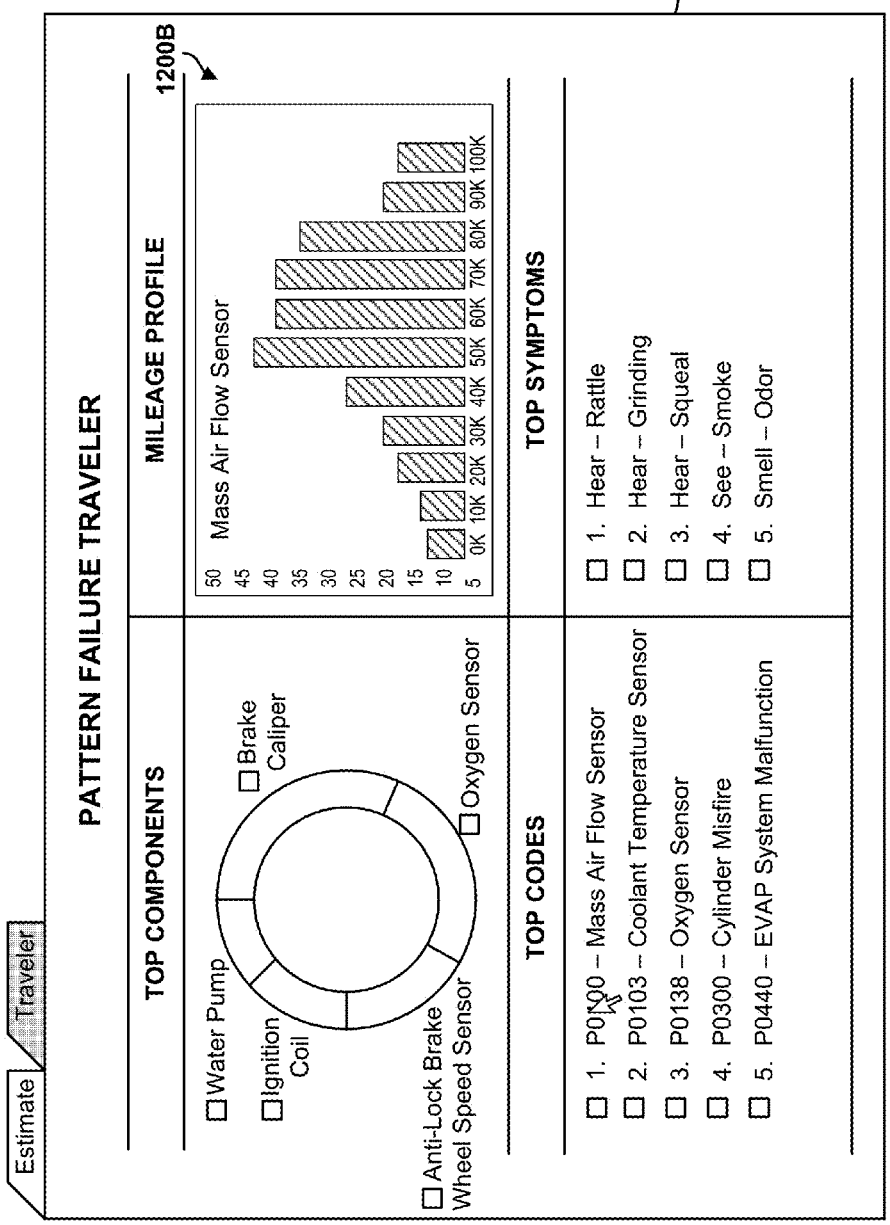

As shown in FIG. 12B, if a computing devices receives data indicating a selection of the "P0100—Mass Air Flow Sensor" DTC, the computing device may provide a vehicle-usage profile 1200B for the particular DTC. By way of example, the vehicle-usage profile 1200B includes a histogram having a plurality of bins corresponding to a plurality of mileage intervals. Looking at the vehicle-usage profile 1200B may provide the service technician with an estimate of when, over the usage of a vehicle, the particular DTC is reported for the particular vehicle type.

Figure 12C:
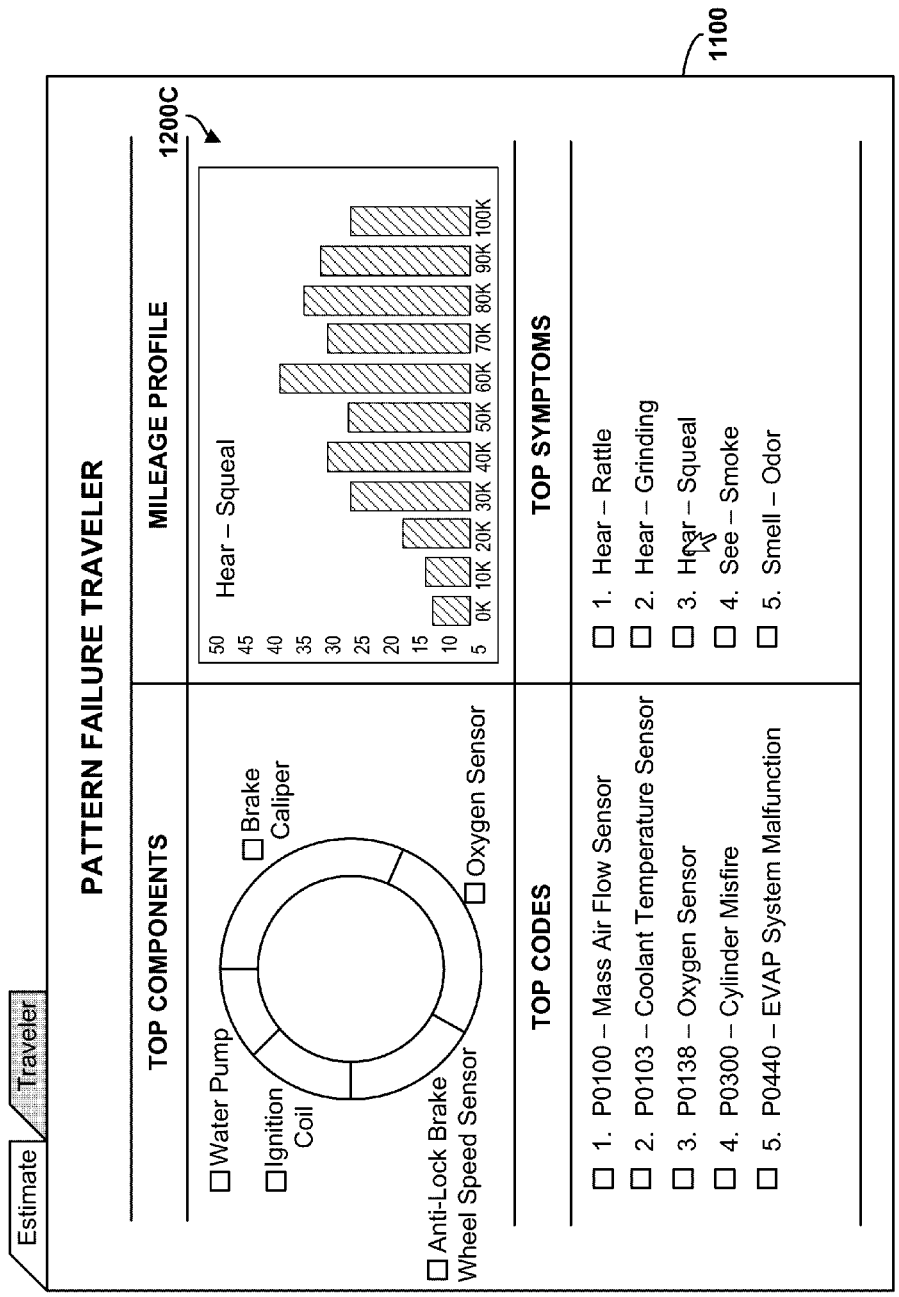

Likewise, a service technician may view a vehicle-usage profile that is indicative of when a particular symptom is reported for the particular vehicle type by selecting a particular symptom. As shown in FIG. 12C, if a computing devices receives data indicating a selection of the "Hear-Squeal" symptom, the computing device may provide a vehicle-usage profile 1200C for the particular symptom. By way of example, the vehicle-usage profile 1200C includes a histogram having a plurality of bins corresponding to a plurality of mileage intervals. Looking at the vehicle-usage profile 1200C may provide the service technician with an estimate of when, over the usage of a vehicle, the particular symptom is reported for the particular vehicle type.

Additionally, in line with the discussion above, a service technician may use the interface 1100 to select one or more potential vehicle fixes for a vehicle. For example, as shown in FIG. 13A, if the service technician verifies that one or multiple brake calipers need to be replaced (e.g., by visually inspecting and testing the vehicle's braking systems), the service technician may select a check-box next to the brake caliper on the interface 1100. In response to receiving a selection of the brake caliper, the computing device can provide a list 1300A of one or more potential vehicle fixes related to the brake caliper. The service technician may then select one or more vehicle fixes from the list 1300A, and the computing device can associate the selected vehicle fix(es) with the vehicle-diagnostic record. For instance, in response to selecting the "Transfer" button 1302, the computing device can associate the selected vehicle fix(es) with the vehicle-diagnostic record. In another example, the list 1300A may be provided in a pop-up window that overlays a portion of the pattern failure traveler (not shown).

Figure 13B:
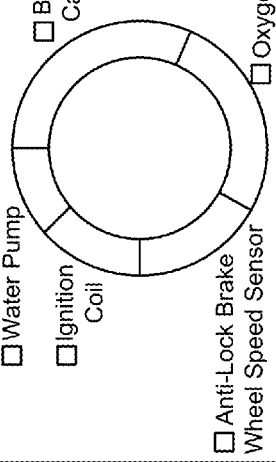

Similarly, as shown in FIG. 13B, if the service technician verifies that a particular DTC is triggered for the particular vehicle, the service technician may select a check-box next to the particular DTC on the interface 1100. In response to receiving a selection of the DTC, the computing device can provide a list 1300B of one or more potential vehicle fixes related to the DTC. The service technician may then select one or more vehicle fixes from the list 1300B, and the computing device can associate the selected vehicle fix(es) with the vehicle-diagnostic record in response to a selection of the "Transfer" button 1302. In another example, the list 1300B may be provided in a pop-up window that overlays a portion of the pattern failure traveler (not shown).

Likewise, as shown in FIG. 13C, if the service technician verifies that a vehicle is exhibiting a particular symptom, the service technician may select a check-box next to the particular symptom on the interface 1100. In response to receiving a selection of the symptom, the computing device can provide a list 1300C of one or more potential vehicle fixes related to the symptom. The service technician may then select one or more vehicle fixes from the list 1300C, and the computing device can associate the selected vehicle fix(es) with the vehicle-diagnostic record in response to a selection of the "Transfer" button 1302. In another example, the list 1300C may be provided in a pop-up window that overlays a portion of the pattern failure traveler (not shown).

Further in line with the discussion above, a server or other computing device can determine estimate information related to at least one potential vehicle fix that is associated with a vehicle-diagnostic record. For example, as described above with respect to FIG. 6, the computing device can determine a repair time for the potential vehicle fix by accessing a database of service labor time standards. And the computing device can determine a shop labor rate for a particular repair shop by accessing a user account for the particular repair shop. Further, the computing device can determine a part cost for any parts associated with the potential vehicle fix by querying one or more EPCs. And to determine to determine a repair cost estimate, the computing device can multiply the determined repair time by the determined shop labor rate to calculate a labor cost. The labor cost may then be combined with the part cost to determine the repair cost estimate.

After the repair cost estimate or repair time estimate have been determined, the computing device can associate the repair cost estimate or the repair time estimate with the vehicle-diagnostic record. For example, the computing device may update the vehicle-diagnostic record maintained by the server to include the repair cost estimate and the repair time estimate.

FIG. 14 illustrates a conceptual illustration of an example interface 1400 that includes estimate information 1402 related to at least one potential vehicle fix. In particular, FIG. 14 illustrates a conceptual illustration of the example interface 1000 of FIG. 10 having been updated to include estimate information for repairing brake calipers. As shown in FIG. 14, by way of example, the estimate information includes a repair time, labor cost, part cost, and total repair cost estimate.

Figure 15:

FIG. 15 illustrates a conceptual illustration of still another example interface 1500. By way of example, the interface 1500 may be a window or tab that is used for displaying potential-repair information associated with a vehicle-diagnostic record, and optionally selecting one or more potential vehicle fixes for a vehicle. For instance, after a service writer or technical has input customer information and vehicle information, a service technician may use the interface 1500 to facilitate diagnosing a vehicle.

As shown in FIG. 15, the interface 1500 includes a list of top repaired components 1502, a list of top repaired DTCs 1504, a list of top repaired symptoms 1506, and a list of top lookups 1508. In one instance, the list of top lookups 1508 may include a list of components that users (e.g., service technicians) most often search for a particular vehicle type.

Additionally, FIG. 15 depicts a search box 1510. In some examples, a user may use the search box 1510 to search for a particular symptom, component, or DTC that does not appear in the list of top repaired components 1502, list of top repaired DTCs, 1504, list of top repaired symptoms 1506, and list of top lookups 1508. In some instances, a user may enter text into the search box 1510, and results of a search may be provided in a display window 1512. For instance, if a user enters a particular component, the results may include a vehicle-usage profile related to the particular component. Other examples are also possible.

Note that in the example interface 1500 of FIG. 15 the search box 1510 is provided near a top of the interface 1500. The example is not meant to be limiting. In other configurations, the search box 1510 may be provided in other locations of the interface 1500 as well.

Figure 16A:
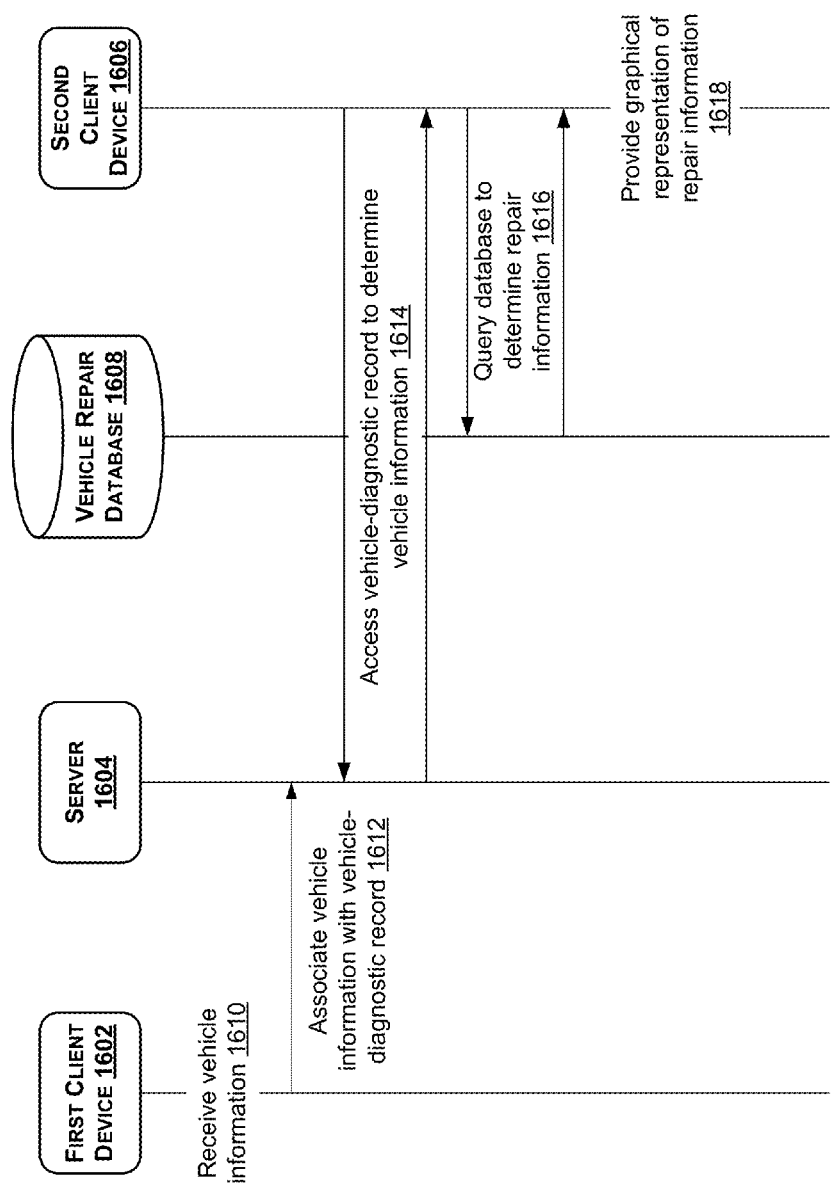
FIGS. 16A and 16B are example flow diagrams for interacting with a vehicle-diagnostic record.
Figure 16B:
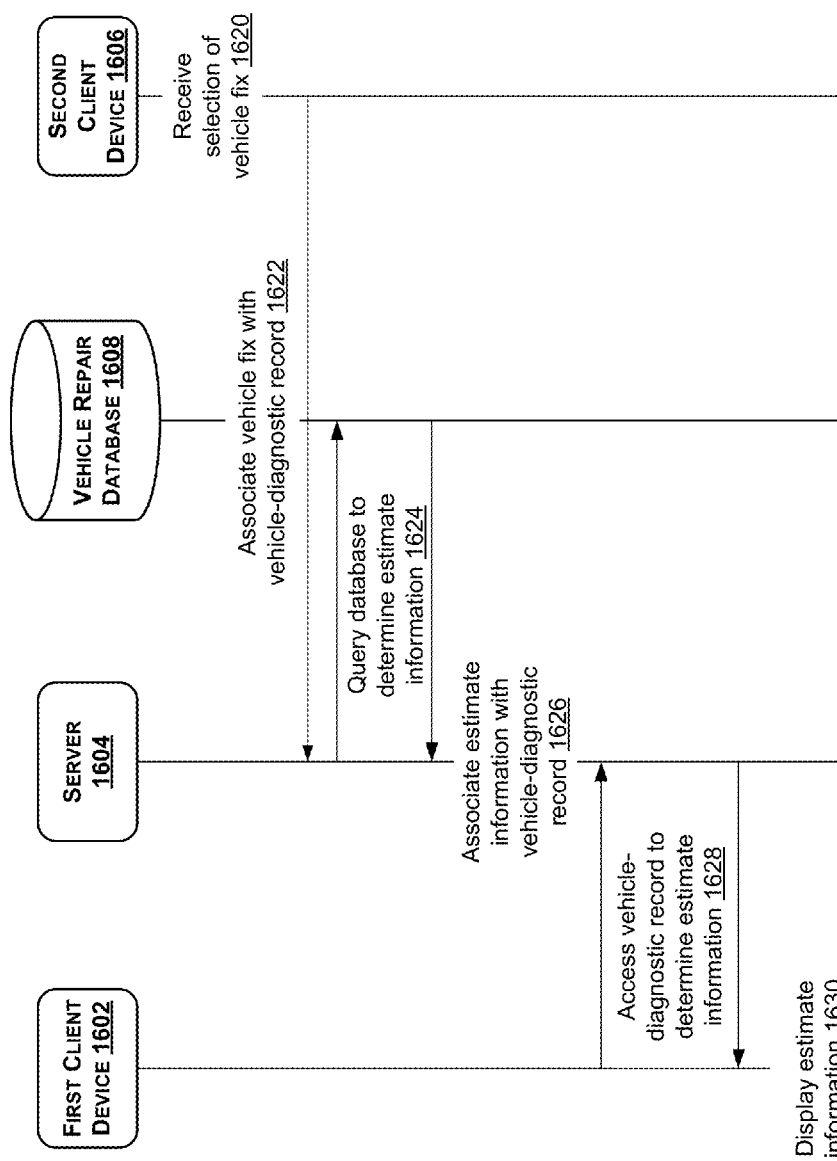

Referring now to FIGS. 16A and 16B, FIGS. 16A and 16B are example flow diagrams for interacting with a vehicle-diagnostic record. In particular, FIGS. 16A and 16B illustrate example interactions between a first client device 1602, a server 1604, a second client device 1606, and a vehicle repair database 1608. For purposes of example, with respect to FIGS. 16A and 16B, it is assumed the first client device 1602 is operated by a service writer and the second client device 1606 is operated by a service technician. In other examples, one or more functions of the first client device 1602 and the second client device 1606 can be performed by a single client device. Alternatively, in some instances, one or more functions of the first client device 1602 and the second client device 1606 can be performed by one or more additional computing devices (not shown).

As shown in FIG. 16A, at block 1610, the first client device 1602 can receive vehicle information. For instance, the first client device 1602 may receive vehicle information that is input by a service writer or scanned from a vehicle. The first client device 1602 can then, at block 1612, associate the vehicle information with a vehicle-diagnostic record that is maintained by the server 1604. For instance, the first client device 1602 can use a web-service or an application programming interface to create a vehicle-diagnostic record. Alternatively, the first client device can associate the vehicle information with a vehicle-diagnostic record by generating a vehicle-diagnostic record having the vehicle information (not shown).

Subsequently, at block 1614, the second client device 1606 can access the vehicle-diagnostic record to determine vehicle information for a particular vehicle type that a service technician is diagnosing. After determining the vehicle information, at block 1616, the second client device 1606 can query the vehicle repair database 1608 to determine repair information related to the particular vehicle type. In line with the discussion above, the second client device 1606 can determine one or any combination of: at least two of the top repaired components related to the vehicle type, at least two of the top reported symptoms related to the vehicle type, and at least two of the top reported DTCs related to the vehicle type. And at block 1618, the second client device 1606 can provide a graphical representation that is indicative of the repair information. For instance, the graphical representation may be a graph or chart that is indicative of a portion of the repair information.

As shown in FIG. 16B, at block 1620, the second client device 1606 can receive a selection of a potential vehicle fix. At block 1622, the second client device can associate the vehicle fix with the vehicle-diagnostic record. Further, at block 1624, the server 1604 can query the vehicle repair database 1608 to determine estimate information related to the vehicle fix. In line with the discussion above, the estimate information may include a repair cost estimate and/or a repair time estimate. At block 1626, the server 1604 can then associate the determined estimate information with the vehicle-diagnostic record.

Subsequently, at blocks 1628 and 1630, the first client device 1602 can access the vehicle-diagnostic record to determine the estimate information, and display the estimate information. For instance, a service writer can access the vehicle-diagnostic record in order to prepare a quote for a customer. Thus, the first client device 1602 and the second client device 1606 can access the vehicle-diagnostic record when interacting with a customer and diagnosing a cause of a vehicle malfunction.

Figure 17:
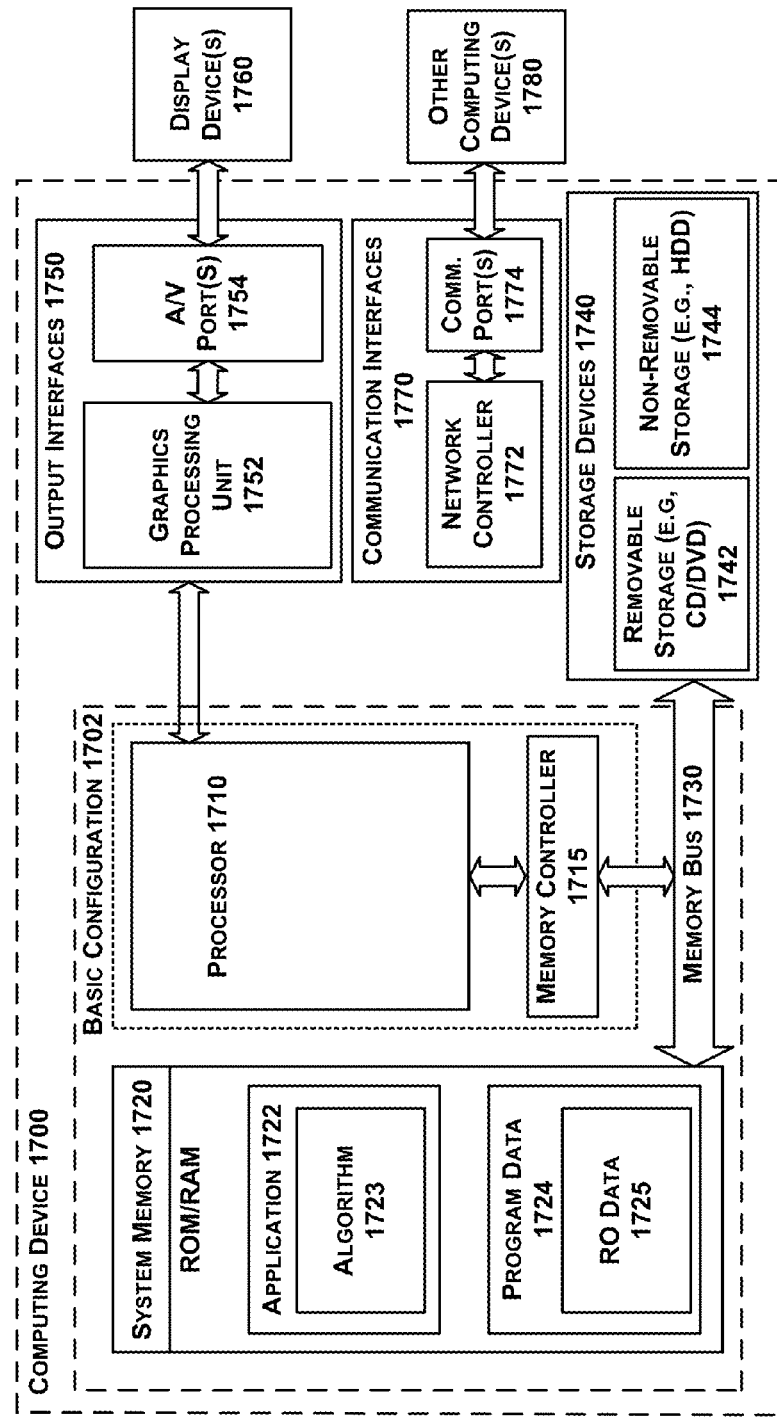
FIG. 17 is a functional block diagram illustrating an example computing device used in a computing system that is arranged in accordance with at least some embodiments described herein.

As described above, the computing devices described herein can be any type of computing device. FIG. 17 is a functional block diagram illustrating an example computing device 1700 used in a computing system that is arranged in accordance with at least some embodiments described herein. The computing device 1700 can be implemented to determine estimate information or repair information, or perform any of the functions described above with reference to FIGS. 1-16. In a basic configuration 1702, computing device 1700 can typically include one or more processors 1710 and system memory 1720. A memory bus 1730 can be used for communicating between the processor 1710 and the system memory 1720. Depending on the desired configuration, processor 1710 can be of any type including but not limited to a microprocessor (μP), a microcontroller (μC), a digital signal processor (DSP), or any combination thereof. A memory controller 1715 can also be used with the processor 1710, or in some implementations, the memory controller 1715 can be an internal part of the processor 1710.

Depending on the desired configuration, the system memory 1720 can be of any type including but not limited to volatile memory (such as RAM), non-volatile memory (such as ROM, flash memory, etc.) or any combination thereof. System memory 1720 can include one or more applications 1722, and program data 1724. Application 1722 can include an algorithm 1723 that is arranged to receive vehicle information and provide the vehicle information to a communication network or receive vehicle information and determine estimate information or repair information, in accordance with the present disclosure. Program data 1724 can include repair order data 1725 that could be directed to any number of types of data. In some example embodiments, application 1722 can be arranged to operate with program data 1724 on an operating system.

Computing device 1700 can have additional features or functionality, and additional interfaces to facilitate communications between the basic configuration 1702 and any devices and interfaces. For example, data storage devices 1740 can be provided including removable storage devices 1742, non-removable storage devices 1744, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 1720 and storage devices 1740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1700. Any such computer storage media can be part of device 1700.

Computing device 1700 can also include output interfaces 1750 that can include a graphics processing unit 1752, which can be configured to communicate to various external devices such as display devices 1760 or speakers via one or more A/V ports 1754 or a communication interface 1770. The communication interface 1770 can include a network controller 1772, which can be arranged to facilitate communications with one or more other computing devices 1780 over a network communication via one or more communication ports 1774. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 1700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1700 can also be implemented as a personal computer, including both laptop computer and non-laptop computer configurations, or a server.

Figure 18:
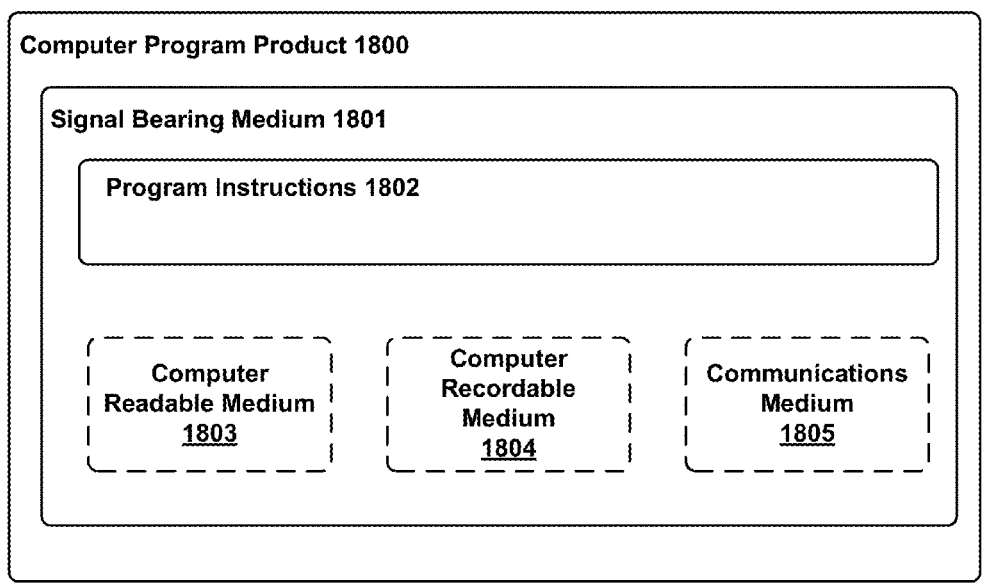
FIG. 18 is a schematic illustrating a conceptual partial view of an example computer program product that includes a computer program for executing a computer process on a computing device, arranged according to at least some embodiments described herein.

In some embodiments, the disclosed methods can be implemented as computer program instructions encoded on a non-transitory computer-readable storage media in a machine-readable format, or on other non-transitory media or articles of manufacture. FIG. 18 is a schematic illustrating a conceptual partial view of an example computer program product 1800 that includes a computer program for executing a computer process on a computing device, arranged according to at least some embodiments presented herein.

In one embodiment, the example computer program product 1800 is provided using a signal bearing medium 1801. The signal bearing medium 1801 can include one or more programming instructions 1802 that, when executed by one or more processors can provide functionality or portions of the functionality described above with respect to FIGS. 1-16. In some examples, the signal bearing medium 1801 can encompass a computer-readable medium 1803, such as, but not limited to, a hard disk drive, a Compact Disc (CD), a Digital Video Disk (DVD), a digital tape, memory, etc. In some implementations, the signal bearing medium 1801 can encompass a computer recordable medium 1804, such as, but not limited to, memory, read/write (R/W) CDs, R/W DVDs, etc. In some implementations, the signal bearing medium 1801 can encompass a communications medium 1805, such as, but not limited to, a digital and/or an analog communication medium (e.g., a fiber optic cable, a waveguide, a wired communications link, a wireless communication link, etc.). Thus, for example, the signal bearing medium 1801 can be conveyed by a wireless form of the communications medium 1805 (e.g., a wireless communications medium conforming to the IEEE 802.11 standard or other transmission protocol).

The one or more programming instructions 1802 can be, for example, computer executable and/or logic implemented instructions. In some examples, a computing device such as the computing device 1700 of FIG. 17 can be configured to provide various operations, functions, or actions in response to the programming instructions 1802 conveyed to the computing device 1700 by one or more of the computer-readable medium 1803, the computer recordable medium 1804, and/or the communications medium 1805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements can be omitted altogether according to the desired results. Further, many of the elements that are described are functional entities that can be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining, by a computing device, vehicle information that comprises a first vehicle identifier for a first vehicle type;
   determining, by the computing device based at least in part on the vehicle information and data regarding repairs previously performed on various vehicles of the first vehicle type that is gathered from multiple repair shops and stored in a vehicle repair database, at least two top repair order items in a first category of repair order items, wherein the first category of repair order items comprises a plurality of repair order items that are related to the first vehicle type, each repair order item of the plurality of repair order items having a respective number of corresponding repair orders in the vehicle repair database that list the repair order item, and wherein the at least two top repair order items have the two most corresponding repair orders in the first category of repair order items; and
   providing, by the computing device and for display, a graphical representation of the at least two top repair order items in the first category of repair order items.

2. The method of claim 1, further comprising:
   receiving, by the computing device, a selection of a particular repair order item of the at least two top repair order items in the first category of repair order items; and
   in response to receiving the selection of the particular repair order item, providing, by the computing device and for display, one or more potential vehicle fixes associated with the particular repair order item.

3. The method of claim 2, further comprising:
   receiving, by the computing device, a selection of at least one potential vehicle fix of the one or more potential vehicle fixes associated with the particular repair order item; and
   associating, by the computing device, the at least one potential vehicle fix with a vehicle-diagnostic record that is stored by a server.

4. The method of claim 1, further comprising:
   receiving, by the computing device, a selection of a particular repair order item of the at least two top repair order items; and
   providing, by the computing device and for display, a vehicle-usage profile for the particular repair order item, wherein the vehicle-usage profile is indicative of a distribution of the repair orders corresponding to the particular repair order item over a plurality of vehicle-usage intervals.

5. The method of claim 4, wherein the vehicle-usage profile comprises a histogram.

6. The method of claim 1, wherein determining the at least two top repair order items in the first category of repair order items comprises querying the vehicle repair database, wherein the vehicle repair database comprises a plurality of repair orders, and wherein individual repair orders of the plurality of repair orders include repair order items.

7. The method of claim 1, wherein the first category of repair order items comprises a category selected from the group consisting of: repaired components, reported diagnostic trouble codes, and reported symptoms.

8. The method of claim 1, further comprising:
    determining, based at least in part on the vehicle information and the data stored in the vehicle repair database, at least two top repair order items in a second category of repair order items, wherein the at least two top repair order items in the second category of repair order items are related to the first vehicle type and determined from among a plurality of repair order items in the second category of repair order items that are related to the first vehicle type; and
    providing for display the at least two top repair order items in the second category of repair order items.

9. The method of claim 8:
    wherein the first category of repair order items comprises a given category selected from the group consisting of: repaired components, reported diagnostic trouble codes, and reported symptoms; and
    wherein the second category of repair order items comprises another category selected from the group that is different from the given category.

10. The method of claim 1, wherein the first vehicle identifier includes an identifier selected from the group consisting of: year, make, model (YMM); year, make, model, engine (YMME); year, make, model, engine, system (YMMES); and vehicle identification number (VIN).

11. The method of claim 1, wherein the vehicle information further comprises vehicle-usage data for a first vehicle.

12. The method of claim 1, wherein determining the at least two top repair order items in the first category of repair order items comprises:
    determining, for each of the repair order items of the plurality of repair order items, the respective number of repair orders corresponding to the repair order item; and
    determining, based on the respective number of repair orders for the repair order items of the plurality of repair order items, the at least two top repair order items in the first category of repair order items.

13. A computing device, comprising:
    at least one processor; and
    a computer-readable medium, configured to store instructions, that when executed by the at least one processor, cause the computing device to perform functions comprising:
        determining vehicle information that comprises a first vehicle identifier for a first vehicle type,
        determining, based at least in part on the vehicle information and data regarding repairs previously performed on various vehicles of the first vehicle type that is gathered from multiple repair shops and stored in a vehicle repair database, at least two top repair order items in a first category of repair order items, wherein the first category of repair order items comprises a plurality of repair order items that are related to the first vehicle type, each repair order item of the plurality of repair order items having a respective number of corresponding repair orders in the vehicle repair database that list the repair order item, and wherein the at least two top repair order items have the two most corresponding repair orders in the first category of repair order items, and
        providing for display a graphical representation of the at least two top repair order items in the first category of repair order items.

14. The computing device of claim 13, wherein the functions further comprise:
    receiving a selection of a particular repair order item of the at least two top repair order items in the first category of repair order items; and
    in response to receiving the selection of the particular repair order item, providing for display one or more potential vehicle fixes associated with the particular repair order item.

15. The computing device of claim 13, wherein the functions further comprise:
    receiving a selection of a particular repair order item of the at least two top repair order items; and
    providing for display a vehicle-usage profile for the particular repair order item, wherein the vehicle-usage profile is indicative of a distribution of the repair orders corresponding to the particular repair order item over a plurality of vehicle-usage intervals.

16. A system, comprising:
    a first client device configured to:
        receive, via a first interface provided on the first client device, vehicle information that comprises a first vehicle identifier for a first vehicle type, and
        associate the vehicle information with a first vehicle-diagnostic record corresponding to a first vehicle; and
    a second client device configured to:
        determine, based at least in part on the vehicle information associated with the vehicle-diagnostic record and data regarding repairs previously performed on various vehicles of the first vehicle type that is gathered from multiple repair shops and stored in a vehicle repair database, at least two top repair order items in a first category of repair order items, wherein the first category of repair order items comprises a plurality of repair order items that are related to the first vehicle type, each repair order item of the plurality of repair order items having a respective number of corresponding repair orders in the vehicle repair database that list the repair order item, and wherein the at least two top repair order items have the two most corresponding repair orders in the first category of repair order items, and
        provide for display a graphical representation of the at least two top repair order items in the first category of repair order items.

17. The system of claim 16, wherein the second client device is further configured to:
    receive, via a second interface provided on the second client device, a selection of a particular repair order item of the at least two top repair order items in the first category of repair order items; and
    in response to receiving the selection of the particular repair order item, provide for display one or more potential vehicle fixes associated with the particular repair order item.

18. The system of claim 17, wherein the second client device is further configured to:

receive, via the second interface, a selection of at least one potential vehicle fix of the one or more potential vehicle fixes associated with the particular repair order item; and associate the at least one potential vehicle fix with the vehicle-diagnostic record.

19. The system of claim 16, wherein associating the vehicle information with the vehicle-diagnostic record comprises providing the vehicle information to a server for association with the vehicle-diagnostic record.

20. The system of claim 16, wherein associating the vehicle information with the vehicle-diagnostic record comprises generating a vehicle-diagnostic record having the vehicle information, and wherein the first client device is further configured to provide the generated vehicle-diagnostic record to the second client device.

* * * * *